United States Patent
Gentry et al.

(10) Patent No.: US 11,214,992 B1
(45) Date of Patent: Jan. 4, 2022

(54) TAILGATE LATCH AND TILTING TRUCK BED SYSTEM

(71) Applicant: MAR-K SPECIALIZED MANUFACTURING, INC., Oklahoma City, OK (US)

(72) Inventors: Kevin Gentry, Oklahoma City, OK (US); Mark Sharp, Oklahoma City, OK (US)

(73) Assignee: MAR-K SPECIALIZED MANUFACTURING, INC., Oklahoma City, OK (US)

(*) Notice: Subject to any disclaimer, the term of this patent is extended or adjusted under 35 U.S.C. 154(b) by 0 days.

(21) Appl. No.: 17/089,654

(22) Filed: Nov. 4, 2020

Related U.S. Application Data

(63) Continuation-in-part of application No. 16/267,892, filed on Feb. 5, 2019, now Pat. No. 10,882,570.

(60) Provisional application No. 62/930,547, filed on Nov. 4, 2019.

(51) Int. Cl.
| | |
|---|---|
| *E05B 83/18* | (2014.01) |
| *B60P 1/04* | (2006.01) |
| *B62D 33/027* | (2006.01) |
| *E05B 1/00* | (2006.01) |
| *B62D 33/08* | (2006.01) |

(52) U.S. Cl.
CPC .............. *E05B 83/18* (2013.01); *B60P 1/04* (2013.01); *B62D 33/0273* (2013.01); *B62D 33/08* (2013.01); *E05B 1/0038* (2013.01); *E05Y 2900/546* (2013.01)

(58) Field of Classification Search
CPC ... E05B 83/18; E05B 1/0038; B62D 33/0273; B62D 33/08; E05Y 2900/546; B60P 1/04; B60P 1/16
See application file for complete search history.

(56) References Cited

U.S. PATENT DOCUMENTS

| | | | | |
|---|---|---|---|---|
| 3,600,038 A | * | 8/1971 | Jones | B60P 1/16 |
| | | | | 298/22 P |
| 3,641,835 A | * | 2/1972 | Tornheim | B60P 1/14 |
| | | | | 74/501.5 R |
| 3,740,097 A | * | 6/1973 | Parker | B60P 1/16 |
| | | | | 298/1 A |
| 3,833,261 A | * | 9/1974 | Dingler | B60P 1/16 |
| | | | | 298/1 A |
| 3,871,706 A | * | 3/1975 | Odom | B60P 1/20 |
| | | | | 298/1 A |
| 4,126,357 A | * | 11/1978 | Day | B60P 1/16 |
| | | | | 298/1 A |
| 4,647,110 A | * | 3/1987 | McKee | B60P 1/32 |
| | | | | 298/1 A |
| 4,940,287 A | * | 7/1990 | Ritchie | B60P 1/16 |
| | | | | 180/24.02 |
| 5,232,259 A | * | 8/1993 | Booker | B60R 11/06 |
| | | | | 224/404 |
| 5,394,761 A | * | 3/1995 | Diebolt | B60P 1/16 |
| | | | | 74/89.21 |

(Continued)

*Primary Examiner* — Justin B Rephann
(74) *Attorney, Agent, or Firm* — Shane Cortesi

(57) ABSTRACT

A tailgate latch system and tilting tailgate for a pickup truck are described. The pickup truck may include a moveable bed that tilts from a resting position in which the moveable bed is generally parallel to the ground to a tilted position in which the moveable bed is angled relative to the ground.

18 Claims, 28 Drawing Sheets

(56) References Cited

U.S. PATENT DOCUMENTS

| | | | | |
|---|---|---|---|---|
| 5,868,453 | A * | 2/1999 | Steigner | B60P 3/40 |
| | | | | 296/100.1 |
| 6,186,596 | B1 * | 2/2001 | Jones | B60P 1/16 |
| | | | | 298/19 B |
| 6,196,634 | B1 * | 3/2001 | Jurinek | B60P 1/16 |
| | | | | 298/1 A |
| 6,698,997 | B2 * | 3/2004 | Arne | B60P 1/28 |
| | | | | 239/672 |
| 7,017,977 | B1 * | 3/2006 | Kelter | B60P 7/135 |
| | | | | 296/182.1 |
| 2016/0280121 | A1 * | 9/2016 | Rike | B05B 13/0221 |
| 2018/0272951 | A1 * | 9/2018 | Oliver | B60R 3/005 |

* cited by examiner

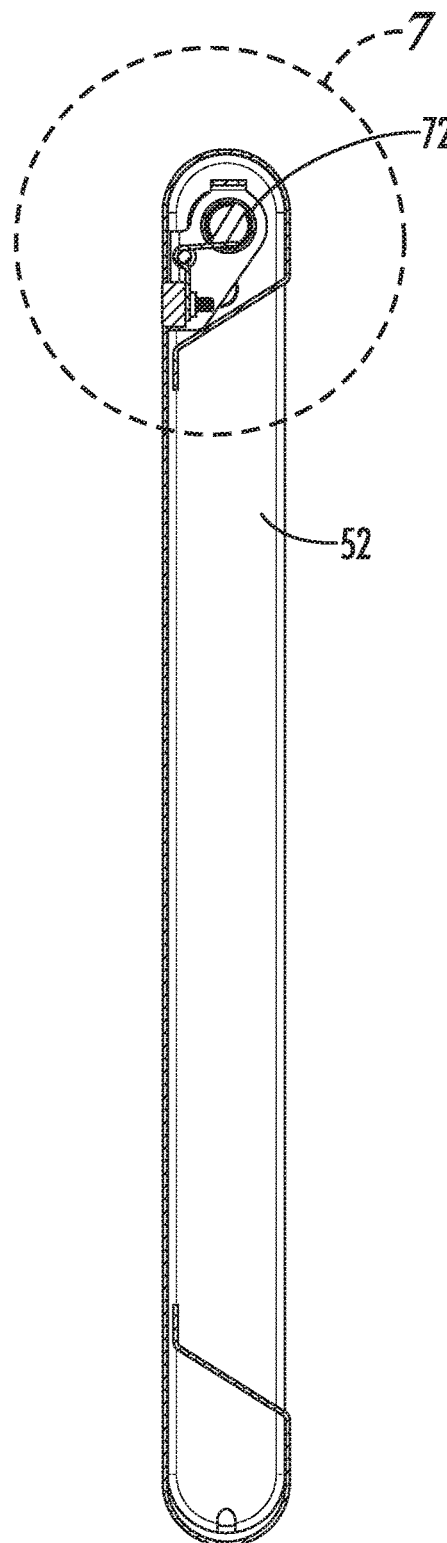
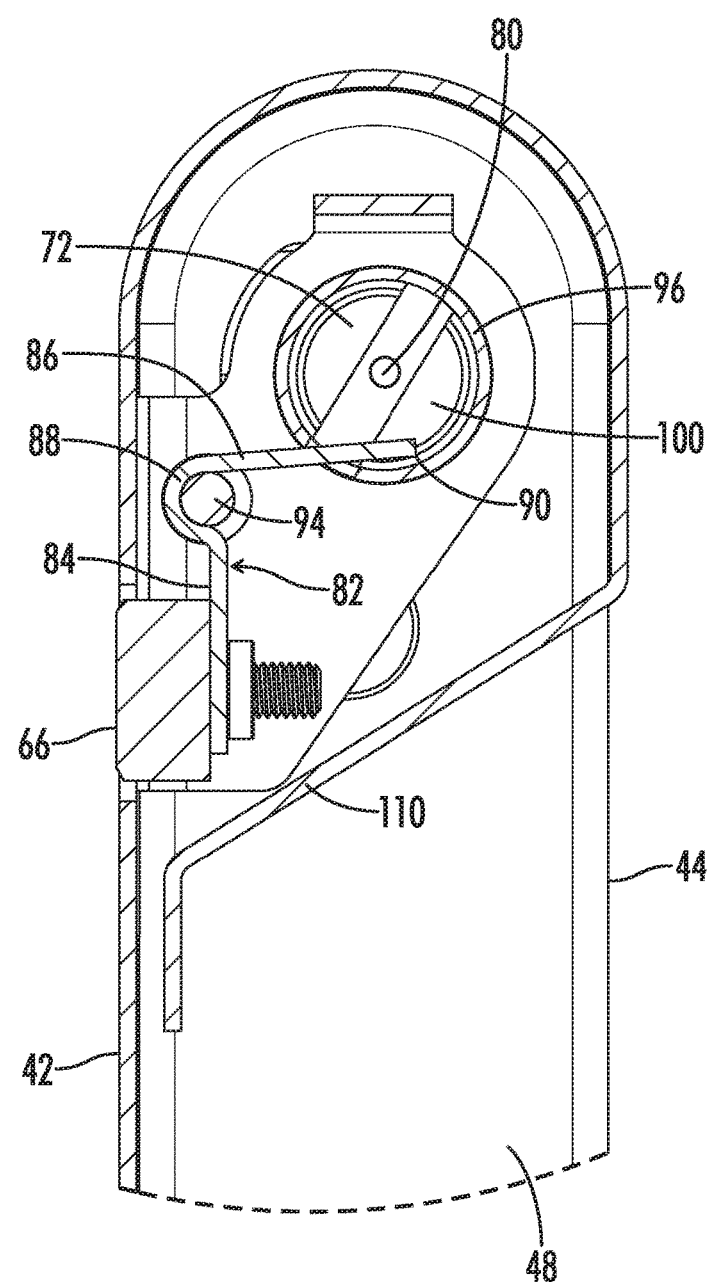
FIG. 6
FIG. 7

US 11,214,992 B1

TAILGATE LATCH AND TILTING TRUCK BED SYSTEM

RELATED APPLICATIONS

This application is a continuation-in-part of U.S. patent application Ser. No. 16/267,892, filed Feb. 5, 2019. This application also claims priority under 35 U.S.C. 119 to Application No. 62/930,547, filed Nov. 4, 2019, the entire contents of both of which are hereby incorporated by reference in their entireties.

BACKGROUND

Technical Field

The present invention relates to latch systems and tilting truck beds for pickup trucks.

Background of the Invention

Present day pickup trucks generally include a latch for closing the tailgate. Examples of known latching systems include U.S. Pat. No. 8,903,605. However, older pickup trucks, which are still coveted by collectors, did not typically include a latch for the tailgate. Instead, typically the tailgates on older pickup trucks were originally latched closed with a chain and hook that served also to hold the tailgate level when it was opened. Thus, due to the chain and hook, old truck tailgates are not aesthetically pleasing and more difficult to open and close than modern trucks.

Thus, there is a need for easy-to-use, reliable apparatuses for opening and closing classic truck tailgates without detracting from their charm.

BRIEF SUMMARY

The present disclosure provides tailgate latches and tilting truck beds as described herein.

BRIEF DESCRIPTION OF THE DRAWINGS

in FIG. 1, the tailgate is in an upright position and the right rotary latch claw is engaging the right bedside striker pin.

in FIG. 2, the tailgate is in a partially lowered position and the right rotary latch claw is not engaging the right bedside striker pin.

in FIG. 3, the tailgate skin is removed to better show the internal components.

in FIG. 4, the tailgate skin is removed to better show the internal components.

in FIG. 5, the tailgate is in an upright position and the right rotary latch claw is engaging the right bedside striker pin.

FIG. 6 illustrates a sectional view of the tailgate of FIG. 5, taken along line 6-6 of FIG. 5.

FIG. 7 illustrates a sectional view of the circled area labelled with the numeral 7 in FIG. 6; in FIG. 7, the push button has not been depressed.

in FIG. 8, the push button has been depressed causing the horizontal bar portion to rotate the at least one rotatable rod clockwise, as compared to FIG. 7.

in FIG. 9, the push button has not been depressed.

in FIG. 10, the push button has been depressed, which has caused the horizontal bar portion to rotate the at least one rotatable rod clockwise as compared to FIG. 9.

in FIG. 11, the push button has not been depressed.

in FIG. 12, the push button has been depressed, which has caused the horizontal bar portion to rotate the at least one rotatable rod clockwise as compared to FIG. 11.

in FIG. 13, the push button has not been depressed.

in FIG. 14, the push button has been depressed, which has caused the horizontal bar portion to rotate the at least one rotatable rod clockwise as compared to FIG. 13.

in FIG. 15, the right rotary latch claw is in a position configured to engage the right bedside striker pin.

in FIG. 16, the right rotary latch claw is in a position configured to engage the right bedside striker pin.

in FIG. 17, the right rotary latch claw is in a position configured to disengage the right bedside striker pin.

in FIG. 18, the right rotary latch claw is in a position configured to disengage the right bedside striker pin.

in FIG. 19, the right rotary latch claw is in a position configured to engage the right bedside striker pin.

in FIG. 20, the right rotary latch claw is in a position configured to engage the right bedside striker pin.

in FIG. 21, the right rotary latch claw is in a position configured to disengage the right bedside striker pin.

in FIG. 22, the right rotary latch claw is in a position configured to disengage the right bedside striker pin.

in FIG. 23, the left and right bedsides and tailgate have been removed for clarity.

in FIG. 27A, the rotary latch is locked, bringing the truck bed to the resting position.

in FIG. 28, the rotary latch is unlocked, bringing the truck bed to the tilted position.

in FIG. 29A, the latch bolt is not engaged with the latch bolt receiver and the truck bed is in the tilted position.

in FIG. 33, the truck bed is in the resting position and the tailgate is in the upright position.

in FIG. 34, the tailgate is in the lowered position and the truck bed is in the resting position.

in FIG. 35, the tailgate is in the lowered position and the truck bed is in the tilted position.

DETAILED DESCRIPTION

Figure 1:
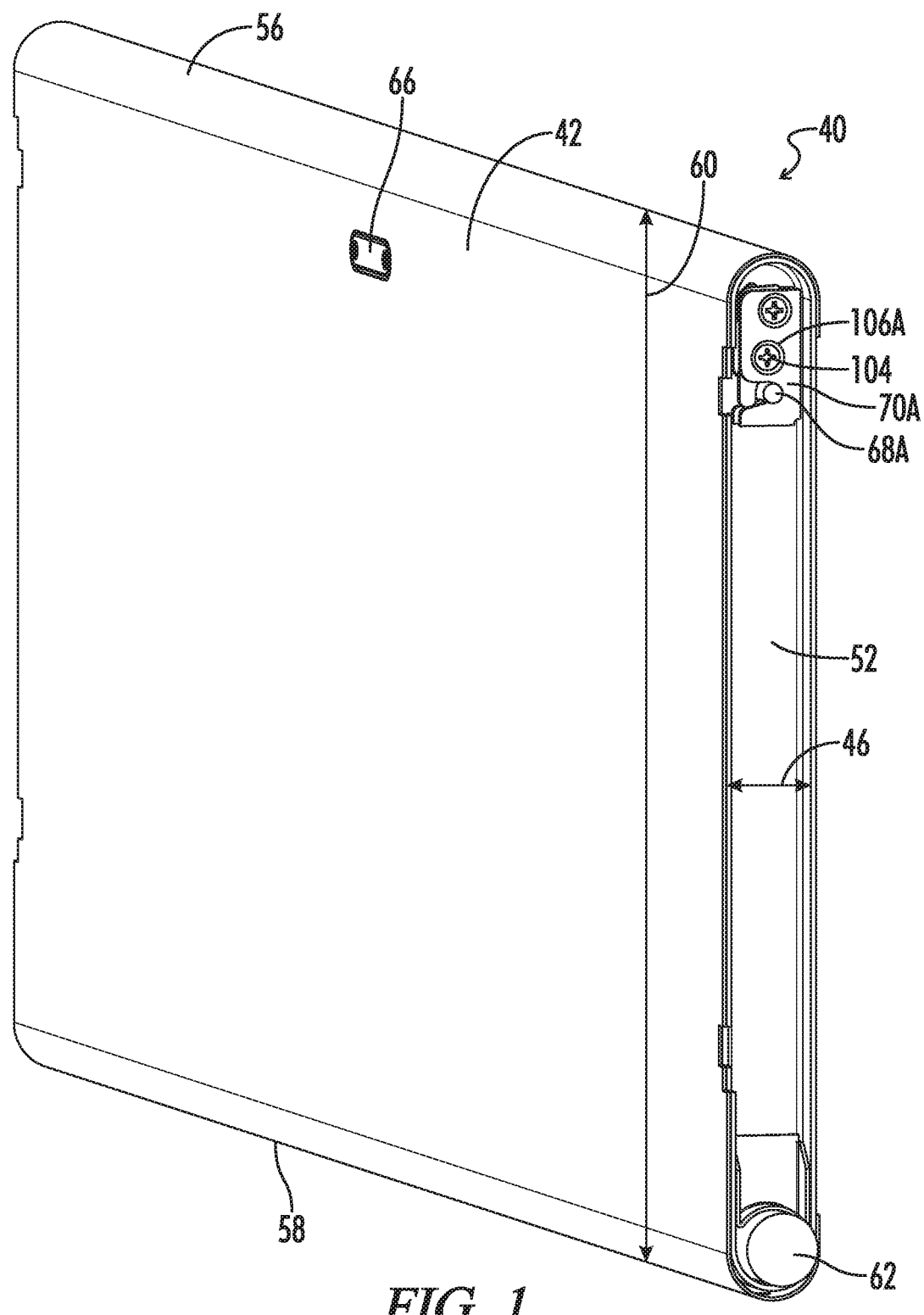
FIG. 1 illustrates a front perspective view of a tailgate and right bedside striker pin of one embodiment of the present invention.
Figure 1A:
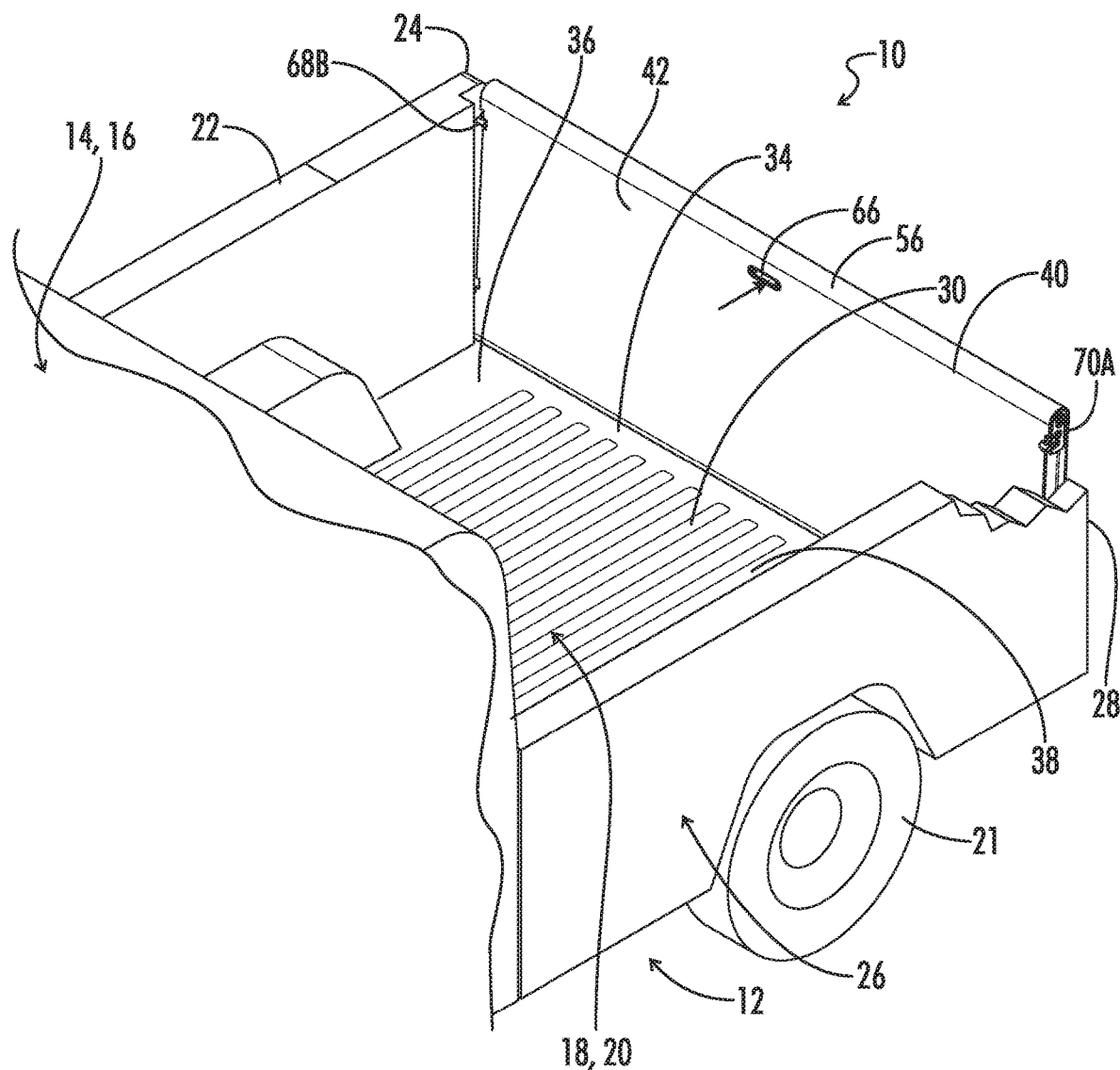
FIG. 1A illustrates a side perspective view of the cargo area of a pickup truck using the tailgate of FIG. 1.
Figure 2:
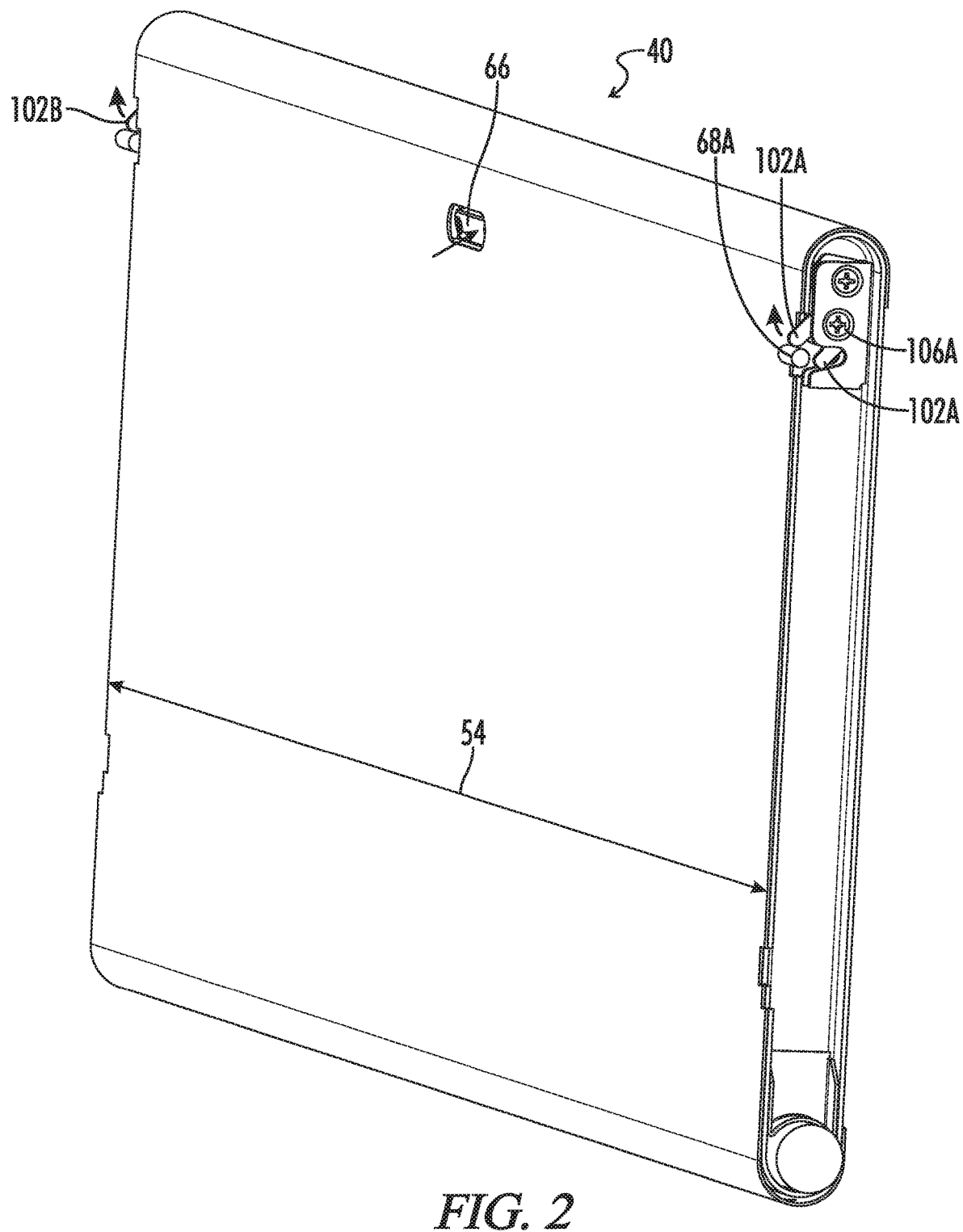
FIG. 2 illustrates a front perspective view of the tailgate and right bedside striker pin of FIG. 1.
Figure 3:
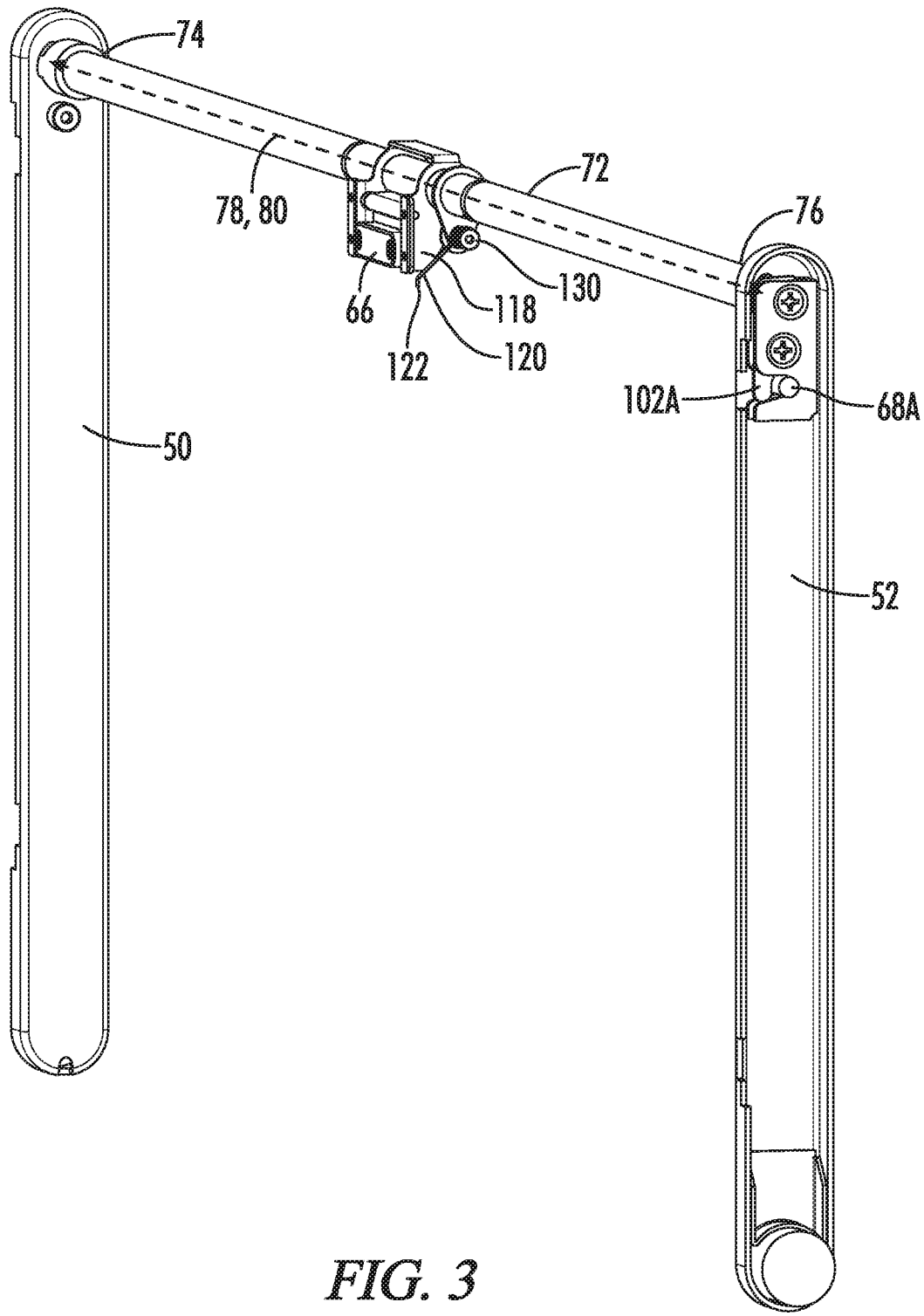
FIG. 3 illustrates a front perspective view of the tailgate and right bedside striker pin of FIG. 1 with the tailgate in the upright position and the right rotary latch claw engaging the right bedside striker pin.
Figure 4:
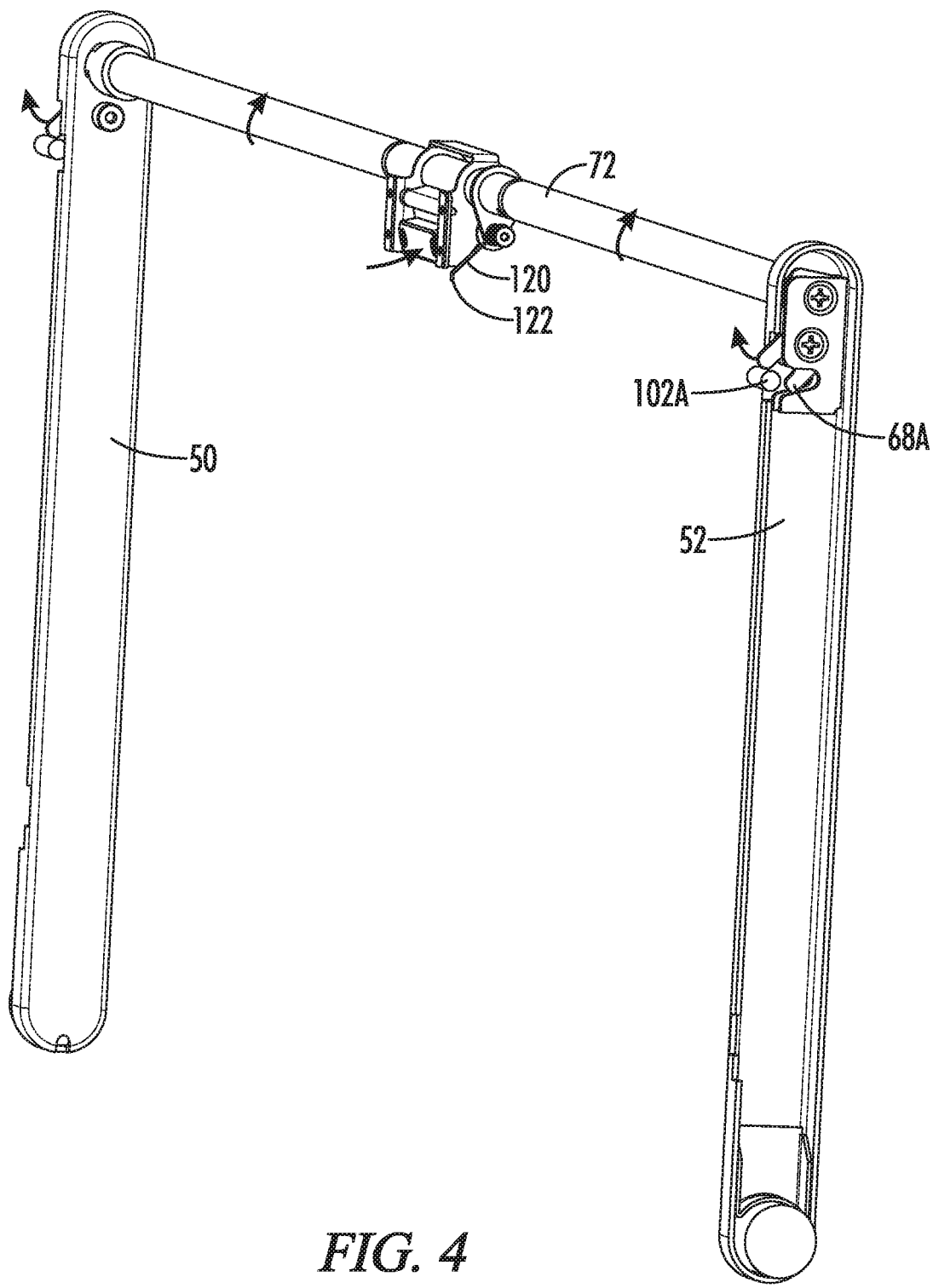
FIG. 4 illustrates a front perspective view of the tailgate and right bedside striker pin of FIG. 1 with the tailgate in a partially lowered position and the right rotary latch claw not engaging the right bedside striker pin.
Figure 5:
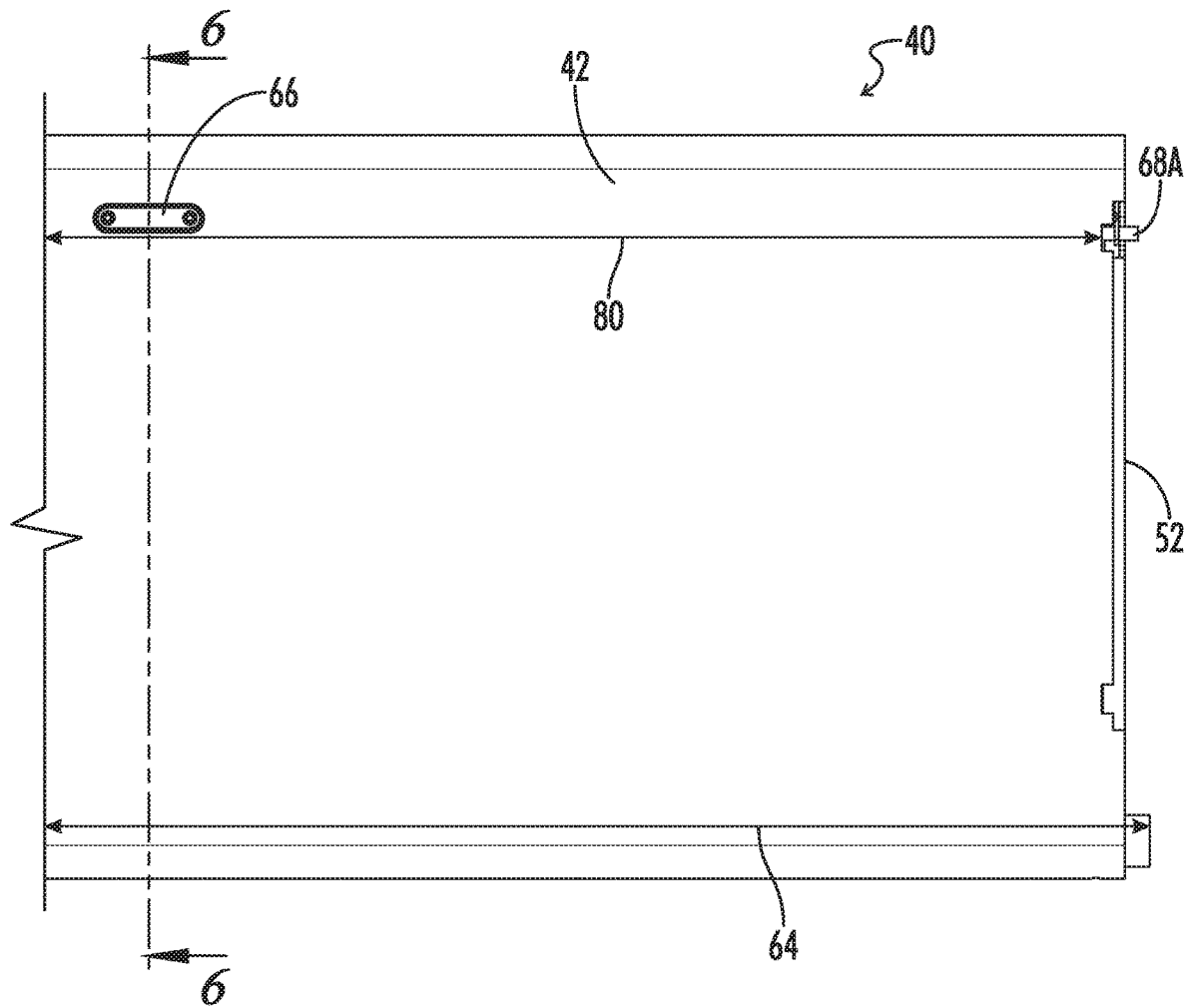
FIG. 5 illustrates a front elevation view of a portion of the tailgate of FIG. 1 and the right bedside striker pin.
Figure 8:
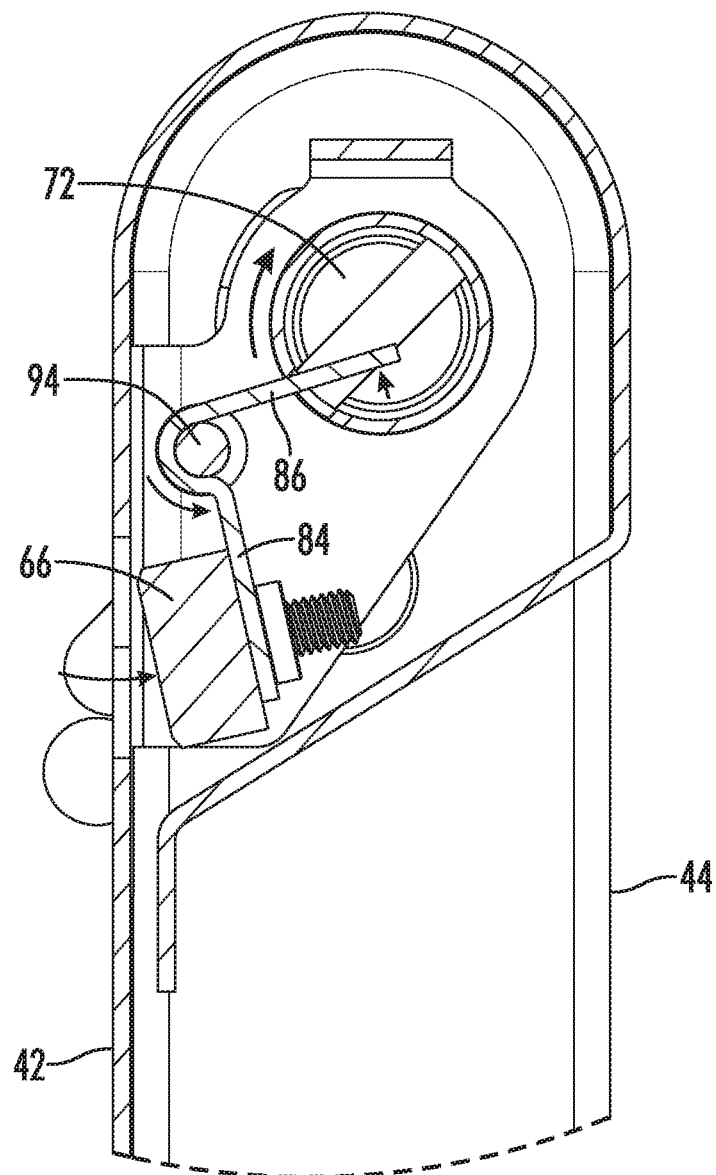
FIG. 8 illustrates a sectional view of the circled area labelled with the numeral 7 in FIG. 6.
Figure 9:
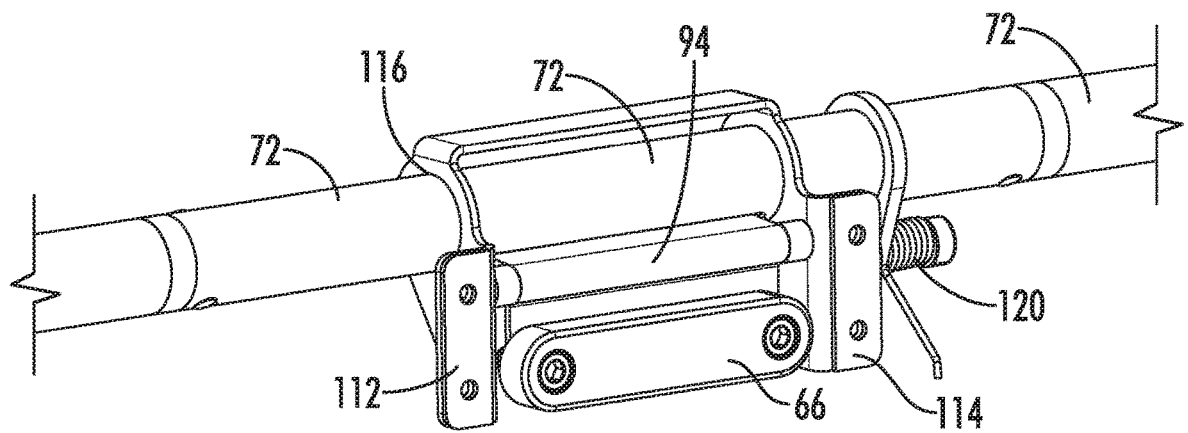
FIG. 9 illustrates a front perspective view of the handle bracket, at least one rotatable rod, spring and push button of the tailgate of FIG. 1.
Figure 10:
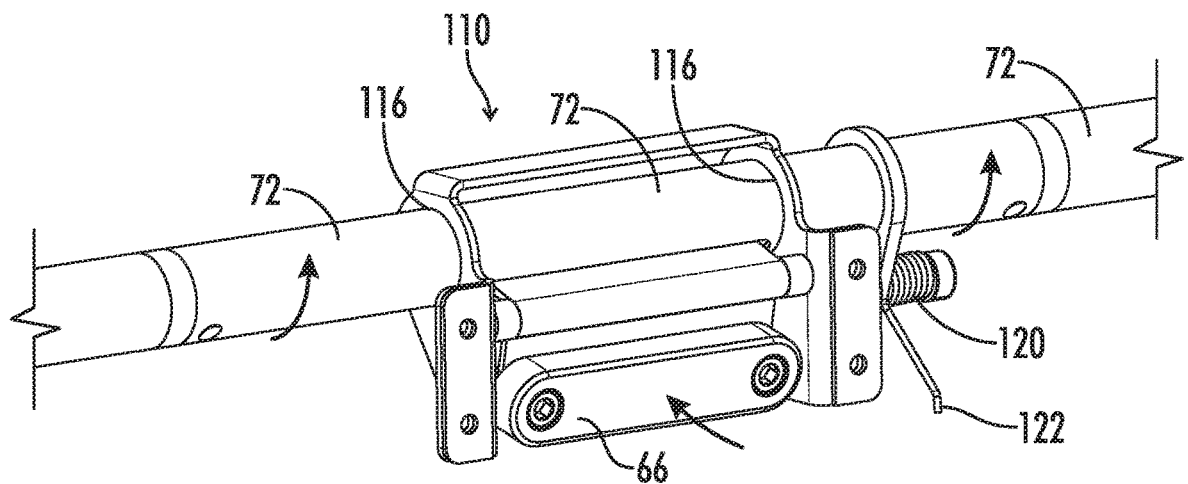
FIG. 10 illustrates a front perspective view of the handle bracket, at least one rotatable rod, spring and push button of the tailgate of FIG. 1.

With reference to FIGS. 1-35, the present invention provides a box generally designated by the numeral 10. In the drawings, not all reference numbers are included in each drawing for the sake of clarity.

With reference to FIGS. 1-22, the present invention provides a tailgate latch system designated by the numeral 10. In the drawings, not all reference numbers are included in each drawing for the sake of clarity. The drawings in FIGS. 1-22 are engineering drawings, drawn to scale. However, it will be understood that other proportions of the components are possible. It will be further appreciated that directional arrows are provided in some figures to show movement of the parts. It will also be appreciated that some components located on the right/driver-side of the truck are labelled with an "A" at the end of the reference numeral and that similar components located on the left/passenger-side of the truck are labelled with a "B" at the end of the reference numeral.

Referring further to FIGS. 1-22, the tailgate latch system 10 may include a pickup truck 12 that may include a plurality of wheels 21, a forward section 14 comprising a truck cab 16, a rear section 18 comprising a cargo area 20 that may include a left bedside 22 having a left bedside rear 24, a right bedside 26 having a right bedside rear 28, and a cargo area bottom comprising a truck bed 30. The truck bed 30 may include a bed front 32, a bed rear 34, a bed left side 36 and a bed right side 38. In the illustrations, the right side is referred to as the driver side and the left side is referred to as the passenger side.

The tailgate gate latch system 10 may further include a tailgate 40 located at the bed rear 34. As with conventional tailgates, the tailgate 40 may include a front surface 42, a rear surface 44, a tailgate thickness 46 extending from the front surface 42 to the rear surface 44, a tailgate interior 48, a tailgate left side 50, a tailgate right side 52, a tailgate width 54 extending from the tailgate left side 50 to the tailgate right side 52 and generally perpendicular to the tailgate thickness 46, a tailgate top 56, a tailgate bottom 58, a tailgate height 60 extending from the tailgate top 56 to the tailgate bottom 58 and generally perpendicular to the tailgate width 54 and tailgate thickness 46. As with conventional tailgates, the tailgate 40 may be hingedly attached to the left bedside 22 and the right bedside 26 by a hinge 62 located adjacent to the tailgate bottom 58, and the tailgate 40 may be configured to pivot along a tailgate pivot axis 64 from an upright position in which the tailgate front surface 42 is generally perpendicular to the truck bed 30 and faces the cargo area 20 to a lowered position in which the tailgate 40 is generally parallel to the truck bed 30.

Unlike conventional tailgates, the tailgate 40 may further include a tailgate gate latch system that may include a button 66 located on the tailgate rear surface 44 or tailgate front surface 42, at least one striker pin/strike bolt 68 located on at least one of the left bedside 22 adjacent to the left bedside rear 24 and the right bedside 26 adjacent to the right bedside rear 28, at least one rotary latch/bear claw 70 configured to releasably engage the at least one striker pin 68 and prevent the tailgate 40 from moving relative to the at least one striker pin 68, and at least one rotatable rod 72, which may be located in the tailgate interior 48 and may be connected to the rotary latch 70 and having a proximal end 74, a distal end 76, and a rotatable rod length 78 generally parallel to the tailgate width 54. Optionally, the tailgate pivot axis 64 is generally parallel to the tailgate width 54. Optionally, the at least one rotary latch 70 is configured to releasably engage/capture the at least one striker pin 68 and maintain the tailgate 40 in the upright position. Optionally, when the tailgate 40 is in the upright position, actuating the button 66 is configured to cause the rotatable rod 72 to rotate counterclockwise or clockwise from a start position about a rod pivot axis 80 generally parallel to the tailgate pivot axis 64 and cause the at least one latch 70 to disengage from the striker pin 68, thereby causing the tailgate 40 to move from the upright position to the lowered position.

Optionally, the button 66 is a depressable push button 66, and, as best seen in FIGS. 6-8 and 13-14, the tailgate latch system further comprises a generally L-shaped button-mounting bracket 82 located in the tailgate interior 48 and having a vertical bar portion 84 attached to the push button 66 (e.g., via a bolt as shown in the illustrations), a horizontal bar portion 86 comprising a proximal end 88 and a free distal end 90, and a generally C-shaped recess 92 located between the horizontal bar portion 86 and vertical bar portion 84, a bracket pin 94 located in the generally C-shaped recess 92. Optionally, the generally L-shaped button-mounting bracket 82 is configured to pivot at the bracket pin 94. Optionally, the at least one rotatable rod 72 adjacent to the horizontal bar portion 86 comprises an interior 100 and a wall 96 surrounding the interior 100 and comprising a slot 98. Optionally, the distal end 90 of the horizontal bar portion 86 extends through the slot 98 into the rotatable rod interior 100, and depressing the push button 66 is configured to move the distal end 90 of the horizontal bar portion 86 upwards at an angle and thereby cause the at least one rotatable rod 72 to rotate clockwise or counterclockwise, as shown by comparing FIG. 13 with FIG. 14 and comparing FIG. 7 with FIG. 8. Optionally, when the tailgate 40 is in the upright position, the vertical bar portion 84 is generally parallel to the tailgate height 60 and the horizontal bar portion 86 is generally perpendicular to the tailgate height 60. Optionally, if the button 66 is located on the tailgate front surface 42, as shown in the illustrations, the distal end 90 is the rear end of the horizontal portion 86, as shown in FIGS. 7-8 and 13-14. (It will be appreciated that positioning the button 66 on the tailgate front surface 42 allows the tailgate rear surface 44, which is visible from the exterior, to look like a classic truck). Optionally, the bracket pin 94 is attached to and, configured to move/rotate, with the generally L-shaped button mounting bracket 82, as shown in FIGS. 7-8 and 13-14.

In the exemplary embodiments shown in the illustration, the rotary latches 70 are Product No. 240-R-54, commercially available from Eberhard (Strongsville, Ohio); https://www.eberhard.com/products/rotaries-strikers/240-241-series/19578 (last accessed Feb. 1, 2019). Rotary latches 70 are also described in, for example, U.S. Pat. Nos. 5,439,260 and 4,703,961, the entire contents of which are incorporated herein by reference. However, it will be understood that any suitable rotary latch may be used. For example, as best seen in FIGS. 19-22, the at least one rotary latch 70 may include at least one rotary jaw 102 comprising two arms separated by a rotary jaw recess 126. Optionally, at least one of the rotatable rod proximal end 74 and rotatable rod distal end 76 comprises an extension 108, and rotation of the rotatable rod 72 is configured to cause the extension 108 to cause the at least one rotary jaw 102 to rotate about a rotary jaw bolt 106 along a rotary jaw pivot axis 104 generally parallel to the tailgate width 54 from a rotary jaw start position in which the two arms of the at least one rotary jaw 102 surrounds the at least one striker pin 68 and the least one striker pin 68 is located in the rotary jaw recess 126 and prevents the at least one striker pin 68 from moving, as shown in FIGS. 1, 3, 5, and 15-16, and 19-20 (striker pin not shown in FIGS. 15-16 and 19-20), to a disengaged position in which the two moveable arms do not surround the at least one striker pin 68 and allow the at least one striker pin 68 to move, as shown in FIGS. 2, 4, and 17-18, and 21-22 (striker pin not shown in FIGS. 17-18 and 21-22). In the illustrations, the tailgate 40 includes a rotary latch 70 located on the tailgate left side 50 configured to engage the left bedside striker pin 68 and the rotary latch 70 located on the tailgate right side 52 configured to engage the right bedside striker pin 68. Optionally, the rotary latch(es) 70 further include a rotary pawl 128 engaging the extension 108 and the rotary jaw 102, and rotation of the rotatable rod 72 is configured to cause the extension 108 to cause the rotary pawl 128 to rotate and thereby cause the rotary jaw 102 to rotate about the rotary jaw bolt 106 along the rotary jaw pivot axis 104, as best seen by comparing FIGS. 21-22 with FIGS. 19-20.

Optionally, as with conventional tailgates, the tailgate 40 comprises a tailgate skin attached to the tailgate left side 50 and tailgate right side 52 and forming the tailgate front surface 42 and tailgate rear surface 44.

Optionally, the button is a push button 66, the tailgate further comprises a handle bracket 110 surrounding the push button 66 and having a left side 112 comprising a round pin opening 114 receiving a portion of the bracket pin 94 and a round rotatable rod opening 116 receiving a portion of the at least rotatable rod 72, and a right side comprising a round opening receiving another portion of the bracket pin 94 and a round rotatable rod opening 116 receiving another portion of the at least one rotatable rod 72. Optionally, the push button 66 is located between the handle bracket left side 112 and the handle bracket right side 118, as best seen in FIGS. 3, 4, and 9-12. Optionally, the handle bracket 110 is attached to at least one of the tailgate front surface 42 and tailgate rear surface 44.

Figure 11:
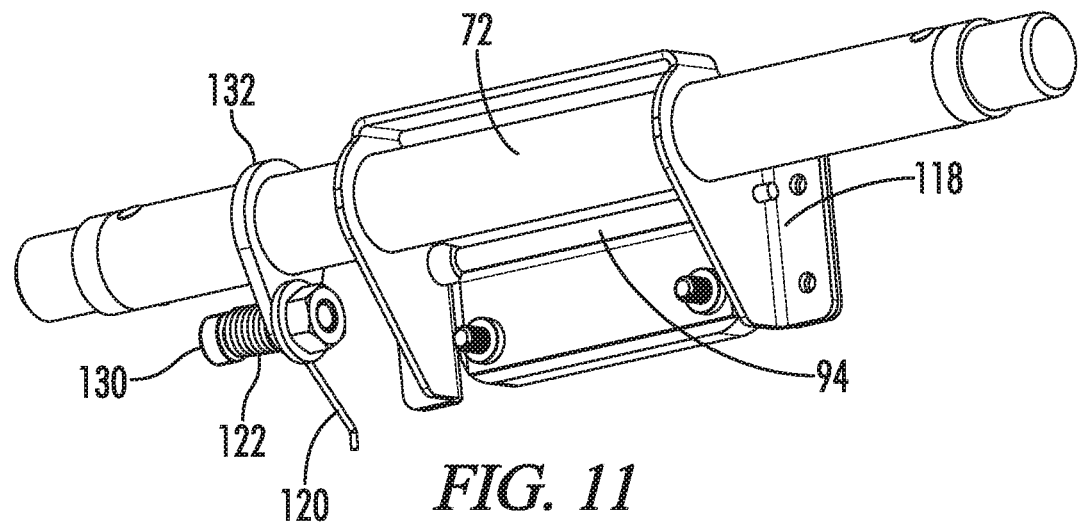
FIG. 11 illustrates a rear perspective view of the handle bracket, at least one rotatable rod, spring and push button of the tailgate of FIG. 1.
Figure 12:
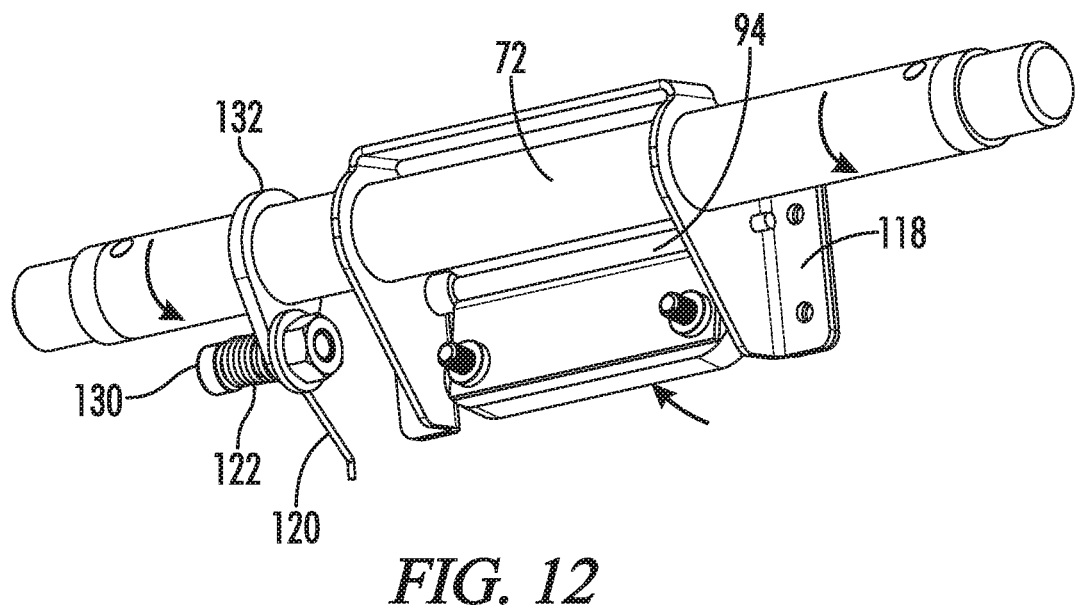
FIG. 12 illustrates a rear perspective view of the handle bracket, at least one rotatable rod, spring and push button of the tailgate of FIG. 1.
Figure 13:
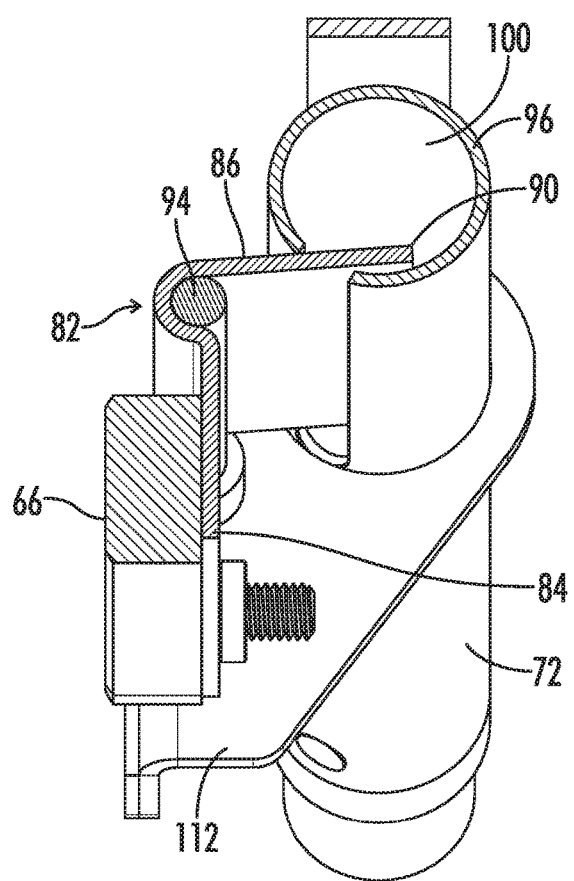
FIG. 13 illustrates a side perspective view of portions of the push button, L-shaped button mounting bracket, at least one rotatable rod and handle bracket of the tailgate of FIG. 1.
Figure 14:
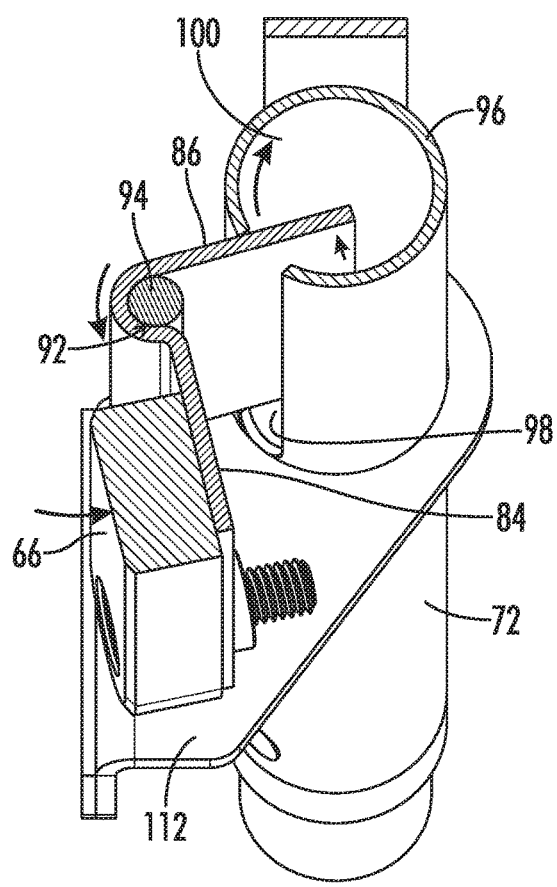
FIG. 14 illustrates a side perspective view of portions of the push button, L-shaped button mounting bracket, at least one rotatable rod and handle bracket of the tailgate of FIG. 1.
Figure 15:
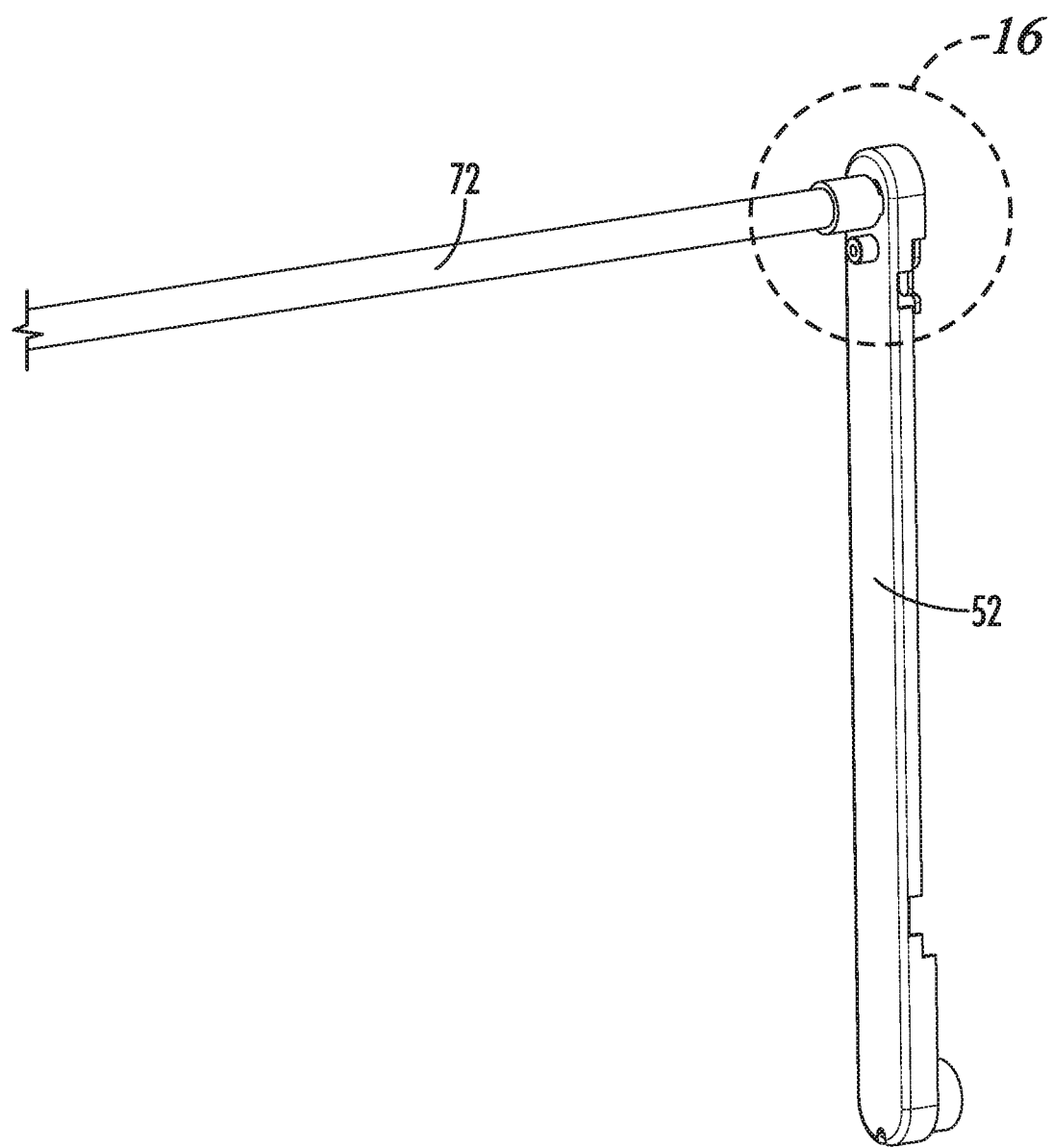
FIG. 15 illustrates a front perspective view of a portion of the at least one rotatable rod, tailgate right side and right side rotary latch of the tailgate of FIG. 1.
Figure 16:
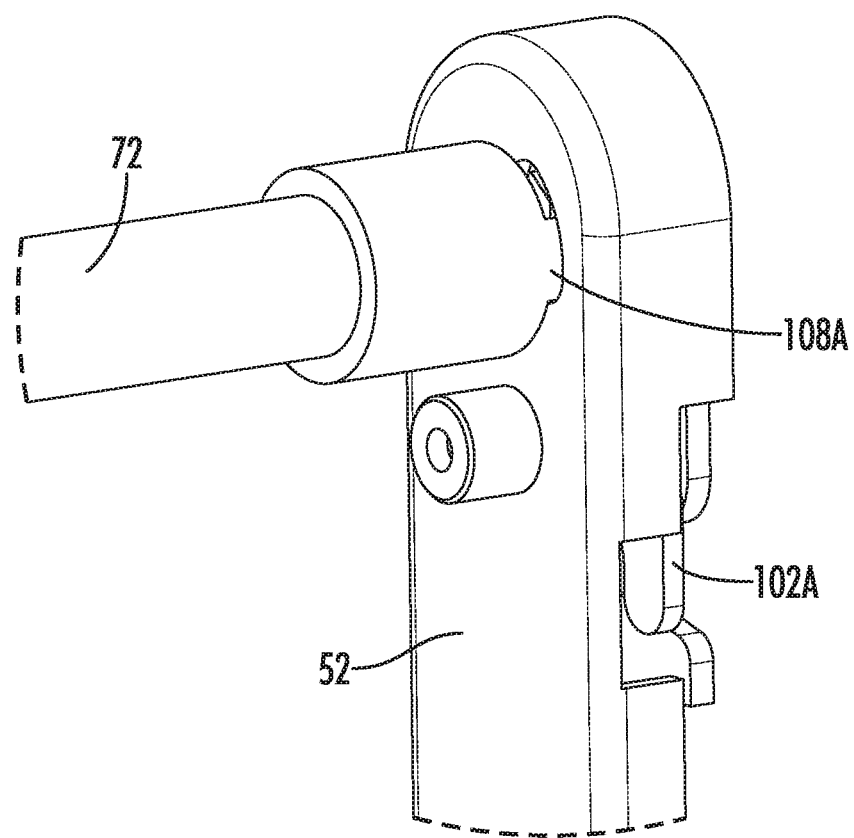
FIG. 16 illustrates a front perspective view of the circled area labelled with the numeral 16 in FIG. 15.
Figure 17:
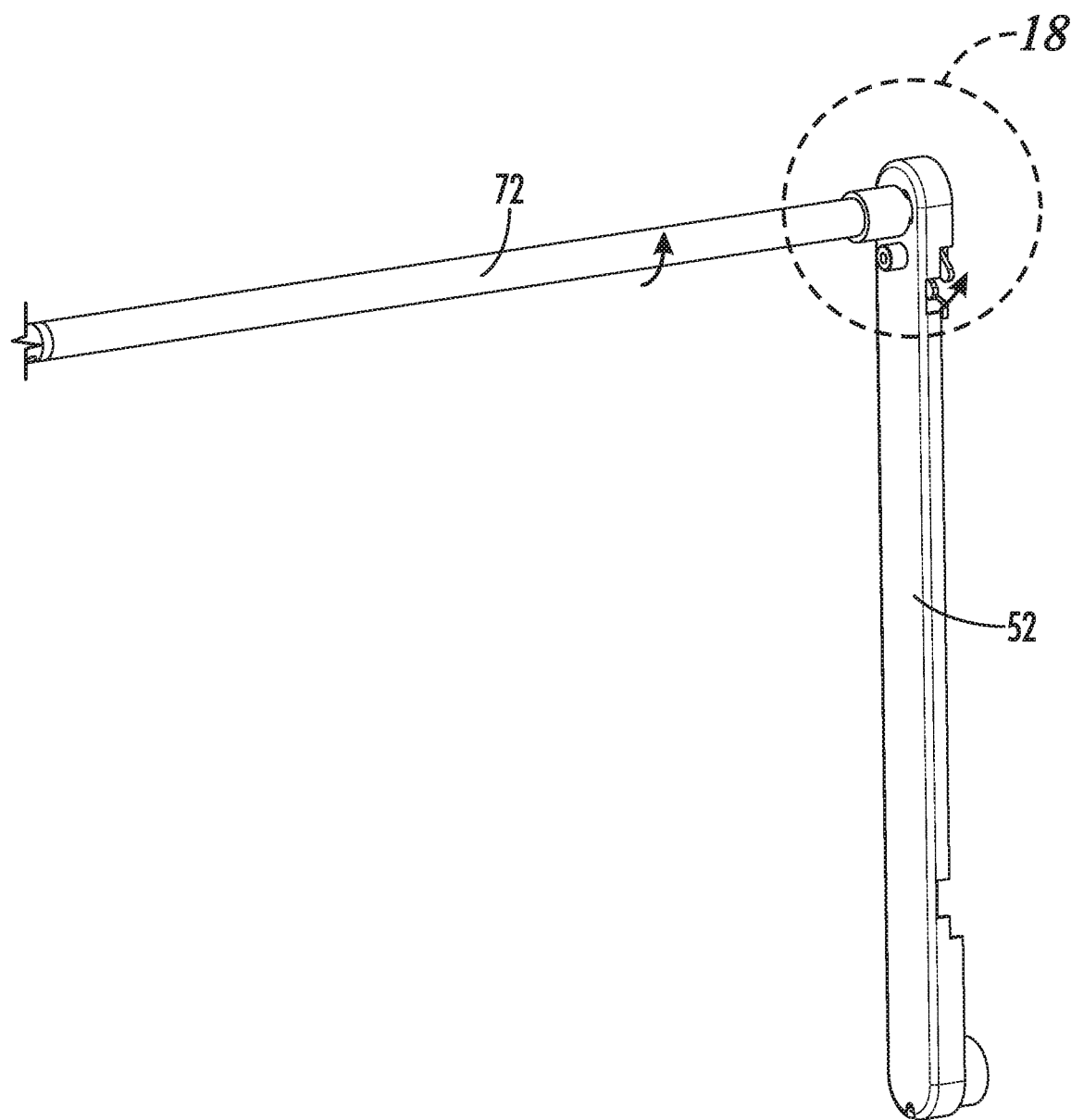
FIG. 17 illustrates a front perspective view of a portion of the at least one rotatable rod, tailgate right side and right side rotary latch of the tailgate of FIG. 1.
Figure 18:
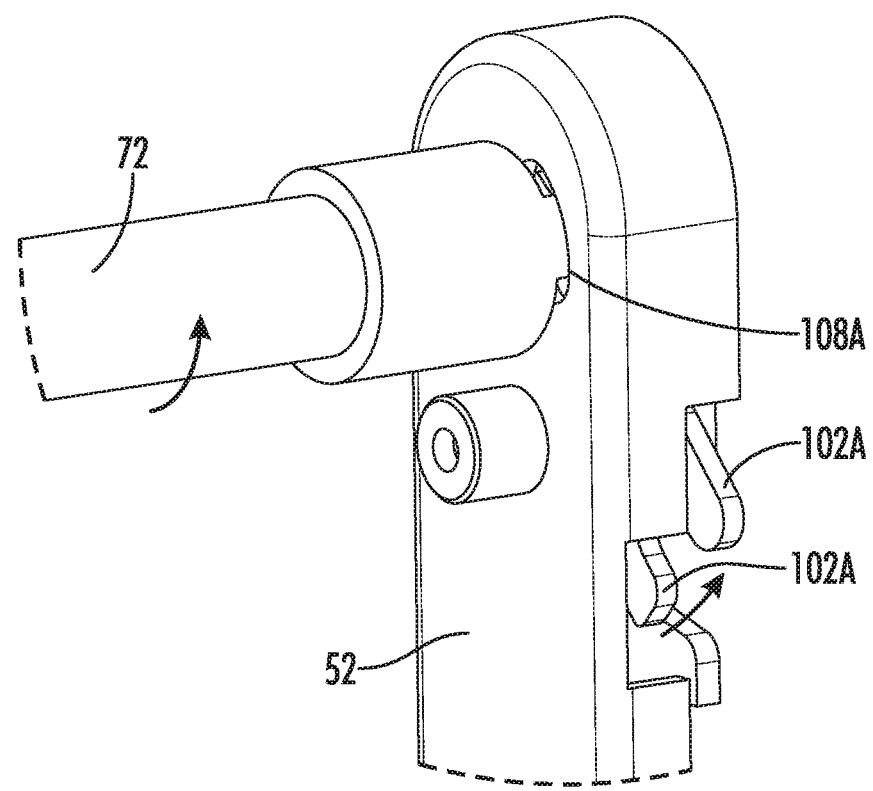
FIG. 18 illustrates a front perspective view of the circled area labelled with the numeral 18 in FIG. 17.
Figure 19:
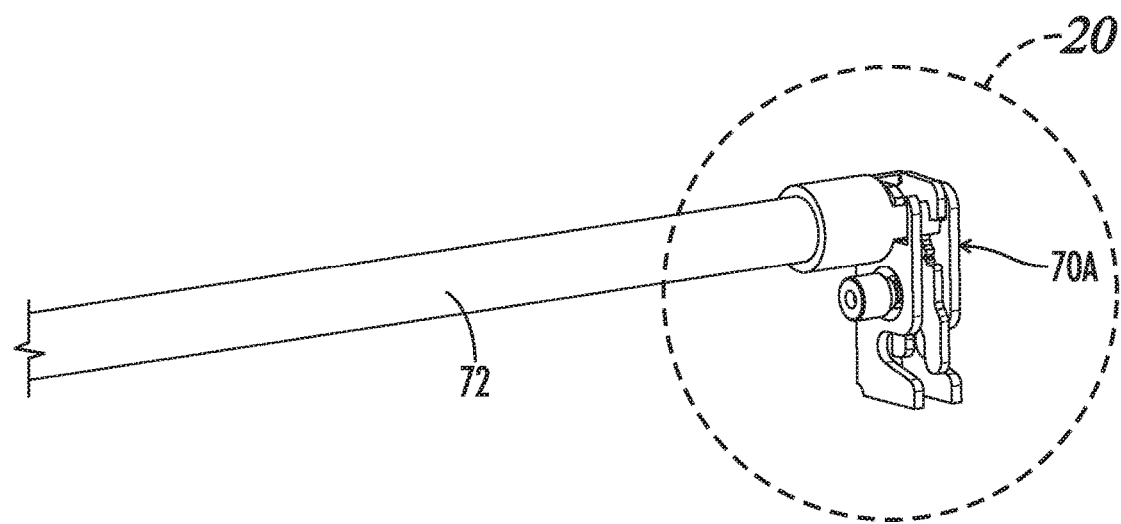
FIG. 19 illustrates a front perspective view of a portion of the at least one rotatable rod and right side rotary latch of the tailgate of FIG. 1.
Figure 20:
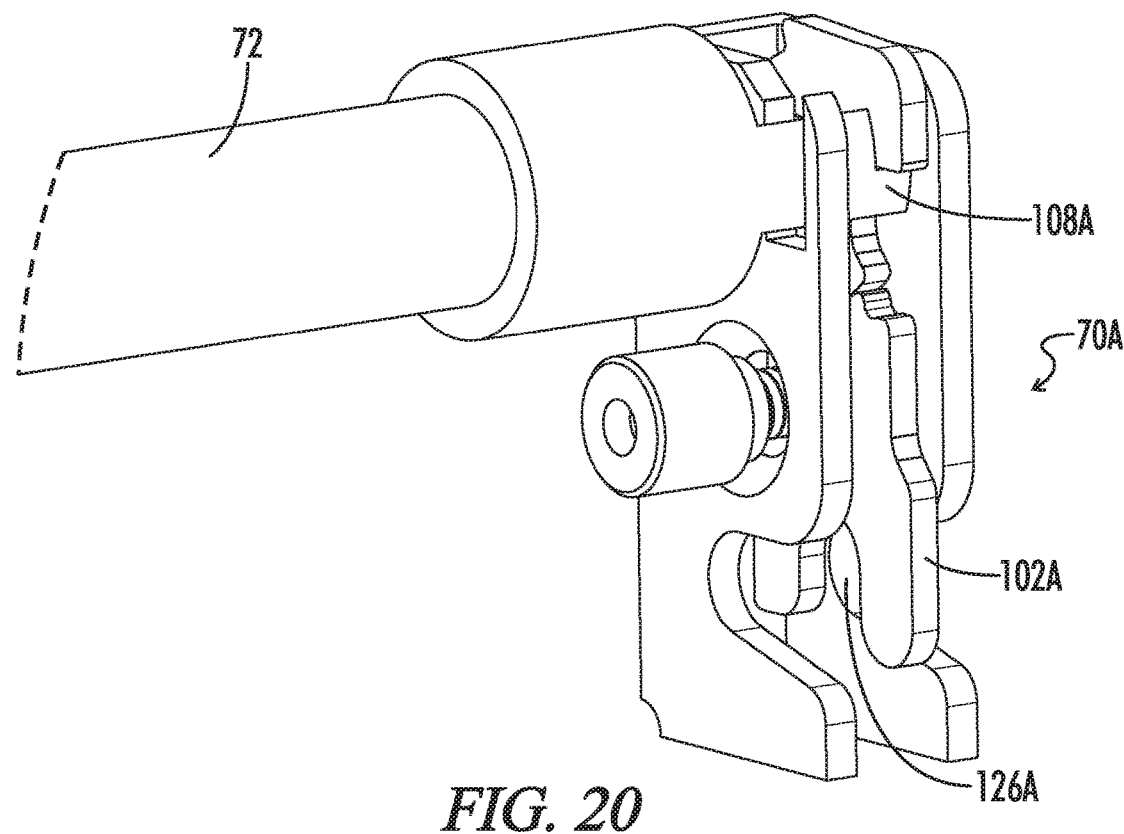
FIG. 20 illustrates a front perspective view of the circled area labelled with the numeral 20 in FIG. 19.
Figure 21:
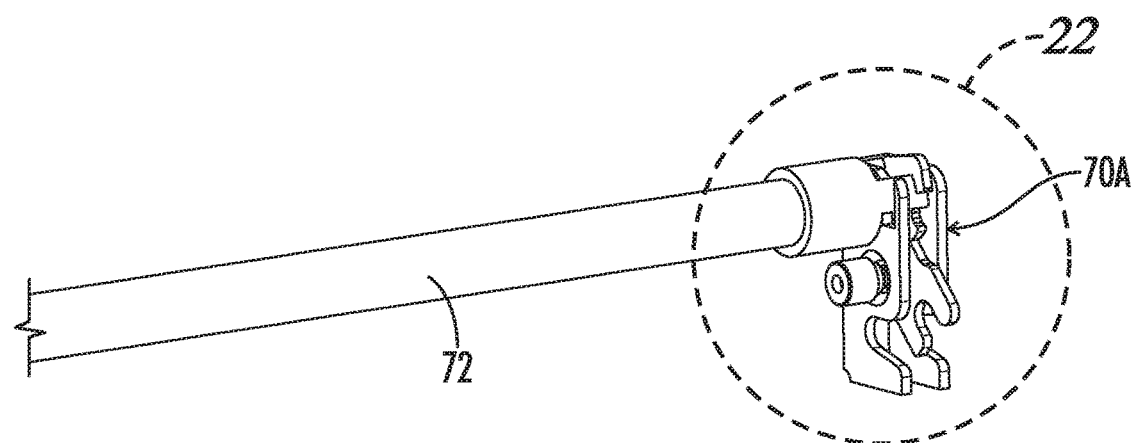
FIG. 21 illustrates a front perspective view of a portion of the at least one rotatable rod and right side rotary latch of the tailgate of FIG. 1.
Figure 22:
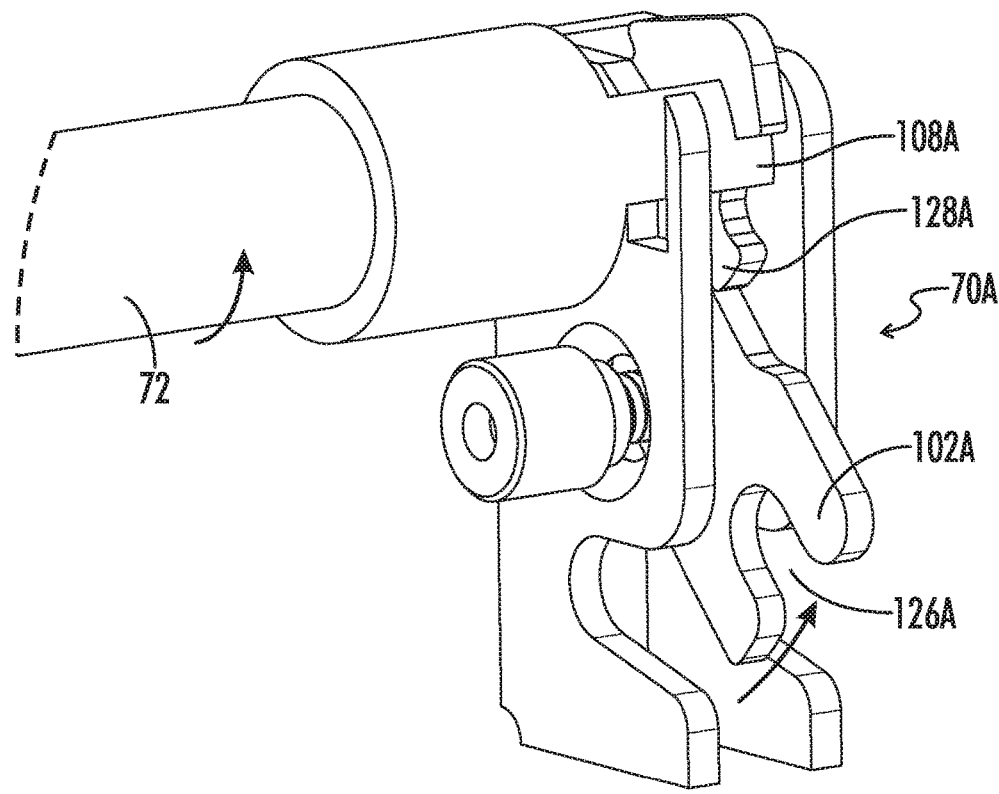
FIG. 22 illustrates a front perspective view of the circled area labelled with the numeral 22 in FIG. 21.
Figure 23:
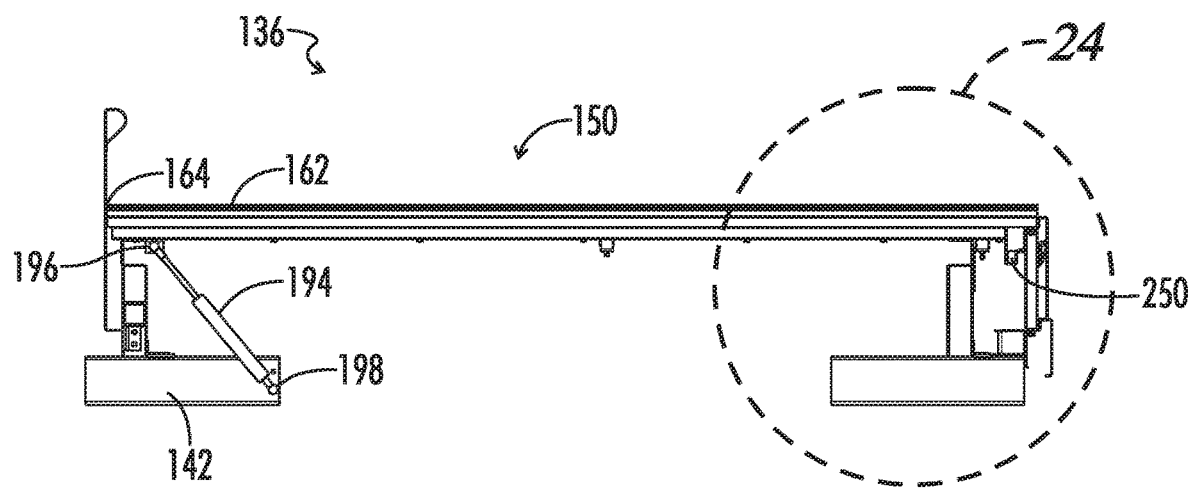
FIG. 23 illustrates a side perspective view of a tilting truck bed in a resting position of one embodiment of the invention.
Figure 24:
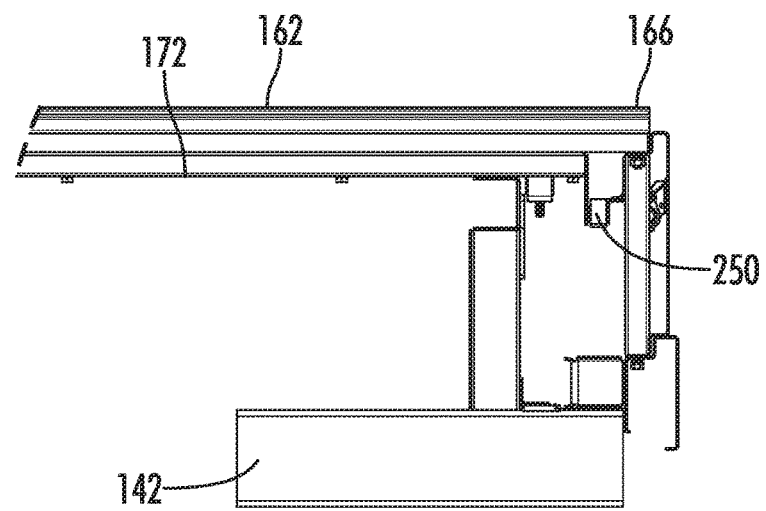
FIG. 24 illustrates a close up view of the area circled in FIG. 23.
Figure 25:
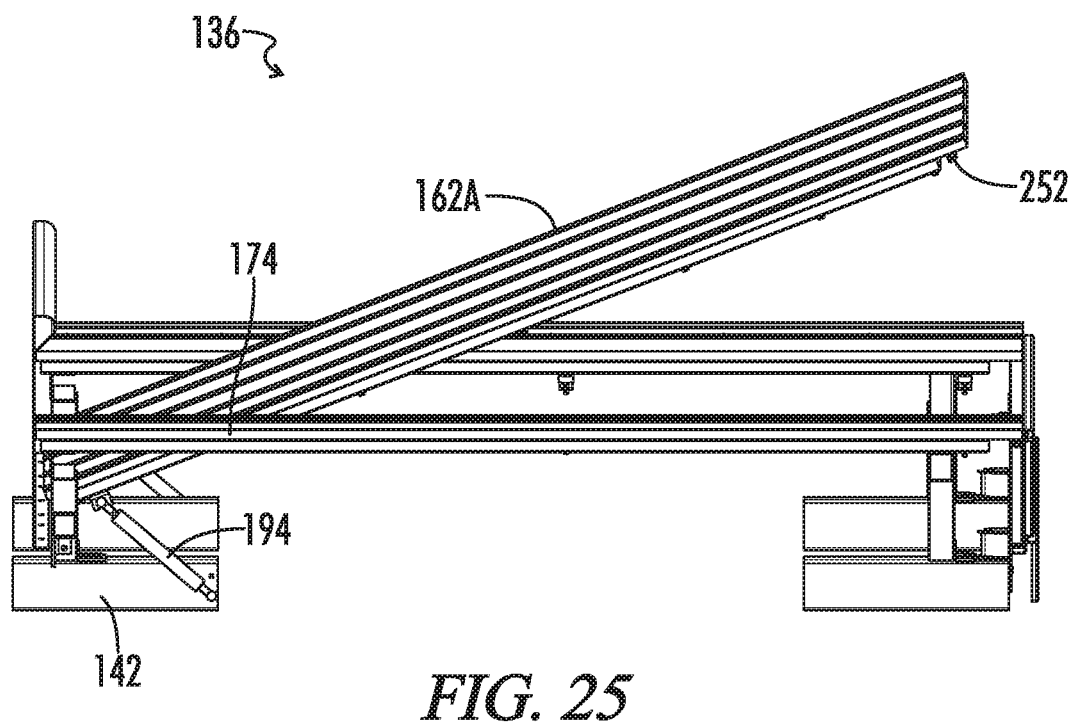
FIG. 25 illustrates a side perspective view of the tilting truck bed of FIG. 23 in a tilted position.
Figure 26:
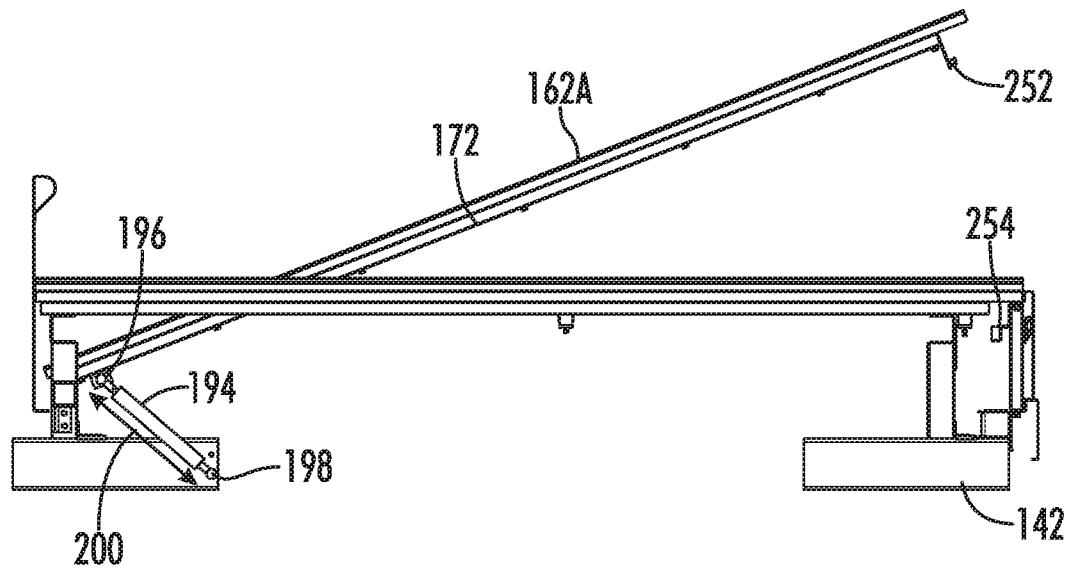
FIG. 26 illustrates a side perspective view of the rear of the tilting truck bed of FIG. 25.
Figure 27:
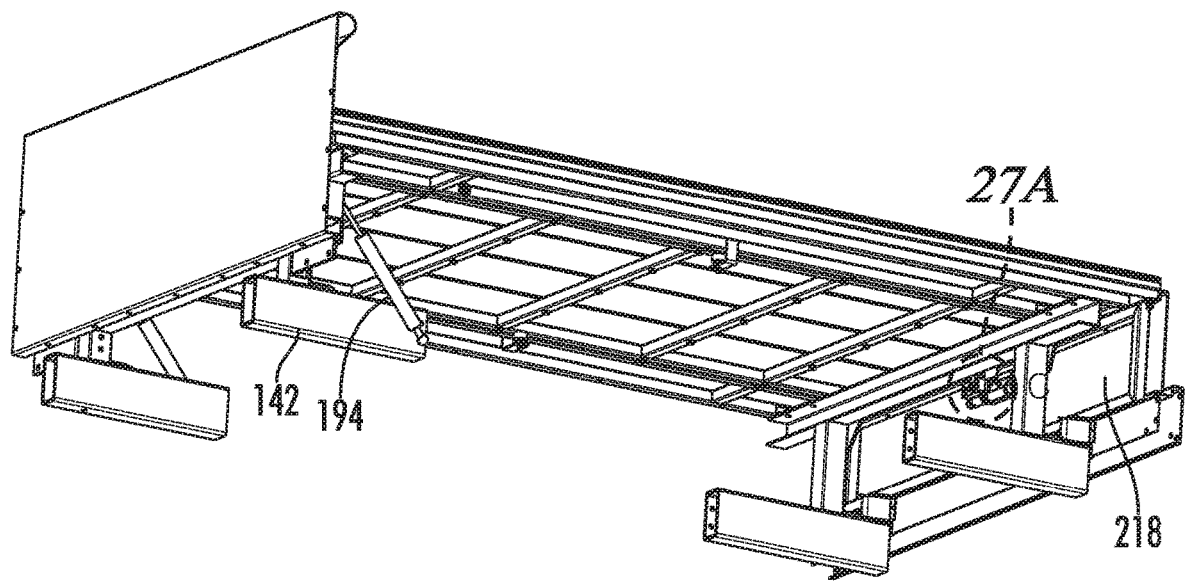
FIG. 27 illustrates a bottom perspective view of the tilting truck bed of FIG. 23 in a resting position.
Figure 27A:
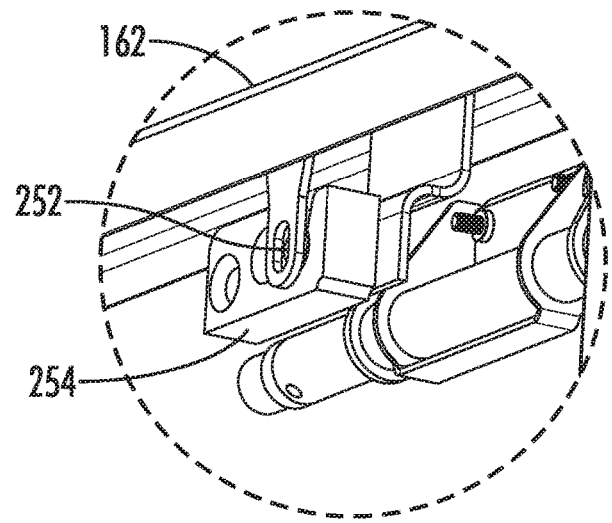
FIG. 27A illustrates a close up view of the area circled 27A in FIG. 27.
Figure 28:
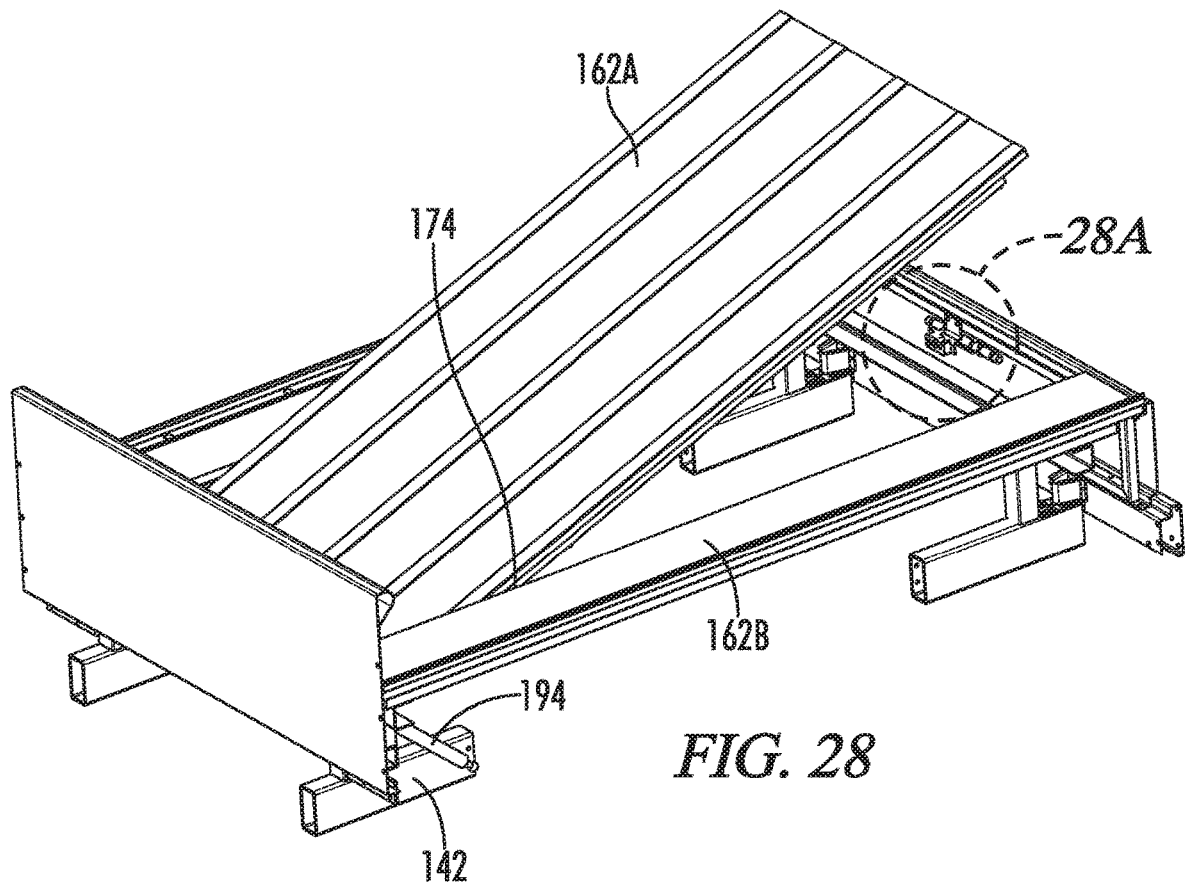
FIG. 28 illustrates a top perspective view of the tilting truck bed of FIG. 23 in a tilted position.
Figure 28A:
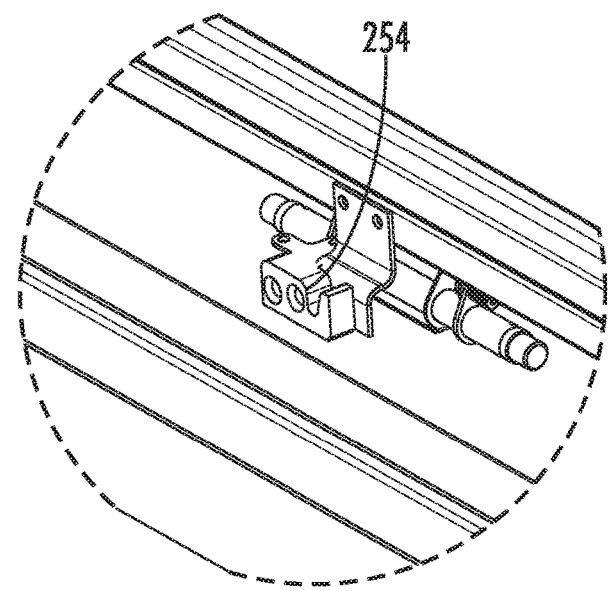
FIG. 28A illustrates a close up view of the area circled 28A in FIG. 28.
Figure 29:
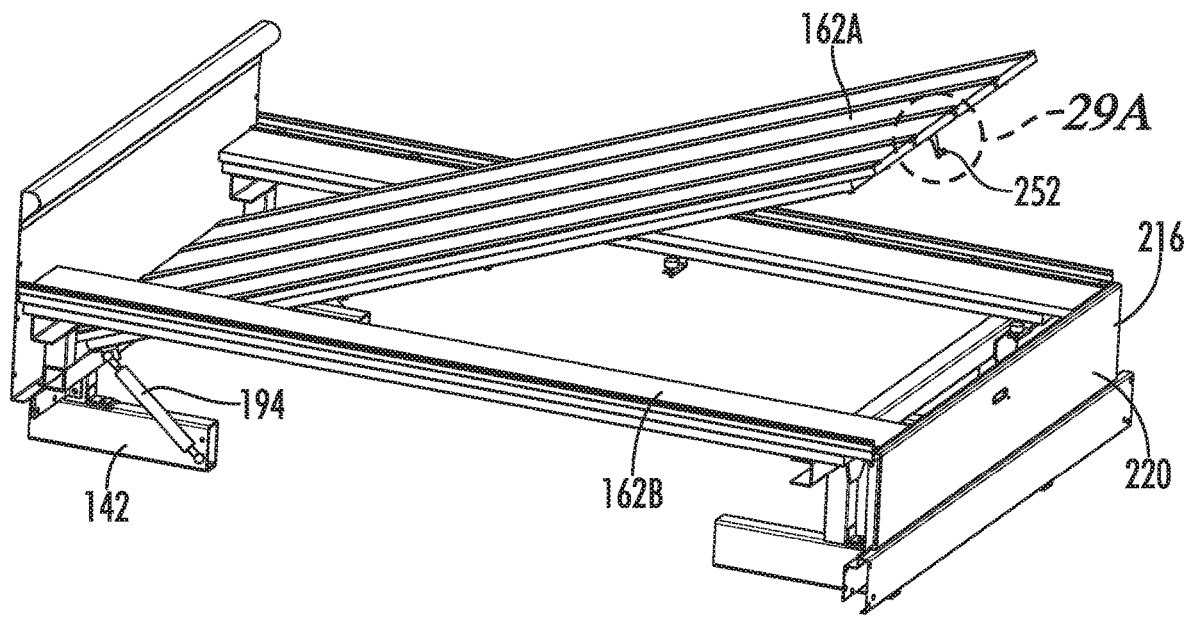
FIG. 29 illustrates a side perspective view of the tilting truck bed of FIG. 23 in a tilted position.
Figure 29A:
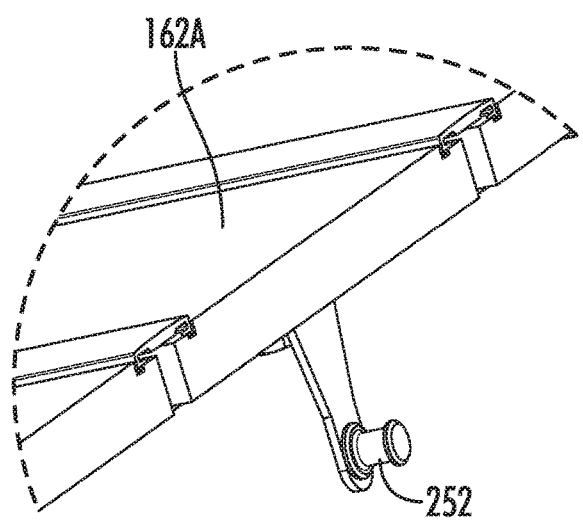
FIG. 29A illustrates a close up view of the area circled 29A in FIG. 29.
Figure 30A:
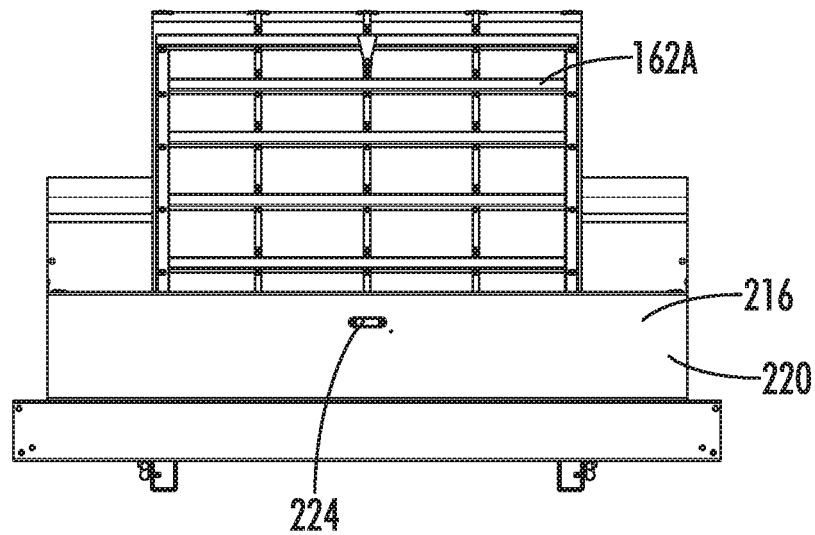
FIG. 30A illustrates a rear elevation view of the tilting truck bed of FIG. 25.
Figure 30B:
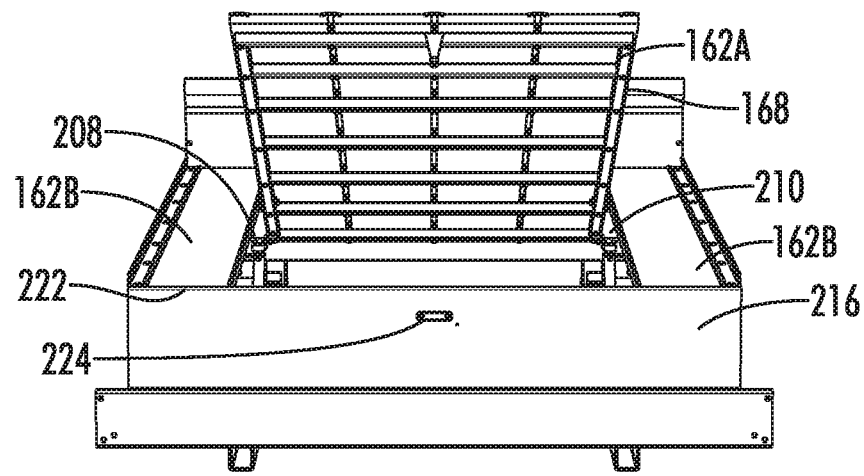
FIG. 30B illustrates a rear perspective view of the tilting truck bed of FIG. 25.

Optionally, as shown in FIGS. 3,4, 9-12, the tailgate latch system further comprises a spring 120 comprising a proximal end 122 connected to (preferably engaging) at least one of the tailgate front surface 42 and tailgate rear surface 44 and a distal end 124 connected to the at least one rotatable rod 72, the spring 120 configured to return the at least one rotatable rod 72 and button 66 to the start position. Optionally, as best seen in FIGS. 11-12, the spring 120 wraps around a spring bolt 130 attached to a spring bracket 132 that is in turn attached to the at least one rotatable rod 72.

Optionally, the at least one rotatable rod 72 is located adjacent to the top of the tailgate 56. Optionally, the hinge is in the form of a hinge rod 62 extending through the tailgate interior 48 and generally parallel to the tailgate width 54 and located below the at least one rotatable rod 72. Optionally, the button is a push button 66, the at least one rotatable rod 72 is configured to rotate approximately between about 5 and 20 degrees when the push button 66 is depressed. Optionally, the at least one rotatable rod 72 is generally cylindrical in shape. Optionally, the at least one rotatable rod 72 is comprised of a plurality of attached rods 70. Optionally, the at least one rotary latch 70 comprises a left rotary latch 70 connected to the at least one rotatable rod proximal end 74 and tailgate left side 50 and a right rotary latch 70 connected to the at least one rotatable rod distal end 76 and tailgate right side 52, the at least one striker pin 68 comprises a left striker pin 68 connected to the left bedside 22 adjacent to the left bedside rear end 24 and a right striker pin 68 connected to the right bedside 26 adjacent to the right bedside rear end 28, and the right rotary latch 70 is configured to releasably engage the right striker pin 68 and the left rotary latch 70 is configured to releasably engage the left striker pin 68.

The Embodiments of FIGS. 23-35

The embodiments of FIGS. 23-35 provide a tilting truck bed 136 to be used in a further embodiment of the present invention. The tilting truck bed 136 may or may not be used in accordance with the tailgate latch system 10 above, or with another latch system as shown for example in FIGS. 27-29 below. The drawings of FIGS. 23-35 are engineering drawings drawn to scale. However, it will be appreciated that other dimensions are possible.

Referring further to FIGS. 23-35, a tilting truck bed 136 and method of tilting a truck bed may be provided. The tilting truck bed 136 may include a pickup truck that may include a plurality of wheels (not shown but previously described) configured to rotate around a plurality of wheel axes and travel along the ground. The pickup truck may include a truck frame 142 connected to the plurality of wheels. The truck frame 142 may include a forward section comprising a truck cab (not shown but previously described) and a rear section located to the rear of the forward section. The rear section may include a cargo area 150 comprising a left bedside 300 having a left bedside rear (not shown but previously described), a right bedside 302 having a right bedside rear, and a cargo area bottom comprising a truck bed 162. The truck bed may be comprised of a moveable portion 162A and a stationary portion 162B. The moveable portion 162A may include a bed front 164, a bed rear 166, a bed left side 168 pivotably connected to the truck frame 142 (more particularly the bed left side 168 may be pivotably attached to the stationary portion 162B) between the bed front 164 and bed rear 166 at a left pivot 170 and a bed right side 172 pivotably connected to the truck frame 142 (more particularly the bed right side 172 may be pivotably attached to the stationary portion 162B) between the bed front 164 and bed rear 166 at a right pivot 174. The left pivot 170 and right pivot 174 may have pivot axes generally parallel to the wheel axes (not shown but previously described). Each of the left bedside 300 and right bedside 302 has a top 303, a bottom 304 and a height 305 extending from the top 303 to the bottom 304. The left pivot 170 and right pivot 174 are preferably located below the tops 303 of the left and right bedsides 300, 302 (and the top 305 of the tailgate 226 when the tailgate 226 is in an upright position). The pickup truck may further include at least one rod 194 having a top end 196 attached to the truck bed 162, a bottom end 198 attached to the truck frame 142 and a rod length 200 extending from the top 196 to the bottom 198.

The truck bed 162 may be configured to tilt about the left pivot axis 176 and right pivot axis 176 between a resting position in which the moveable portion of the truck bed 162A is generally perpendicular to the bed front 164 and generally parallel to the ground and a tilted position in which the truck bed 162 is not generally parallel to the ground and is not generally parallel to the stationary portion 162B. Upon moving from the resting position to the tilted position, the rod top 196 may be configured to move toward the rod bottom 198 and the truck frame 142 may be configured to remain stationary. The pickup truck may further include a lock configured to maintain the truck bed 162 in the resting position.

Figure 31:
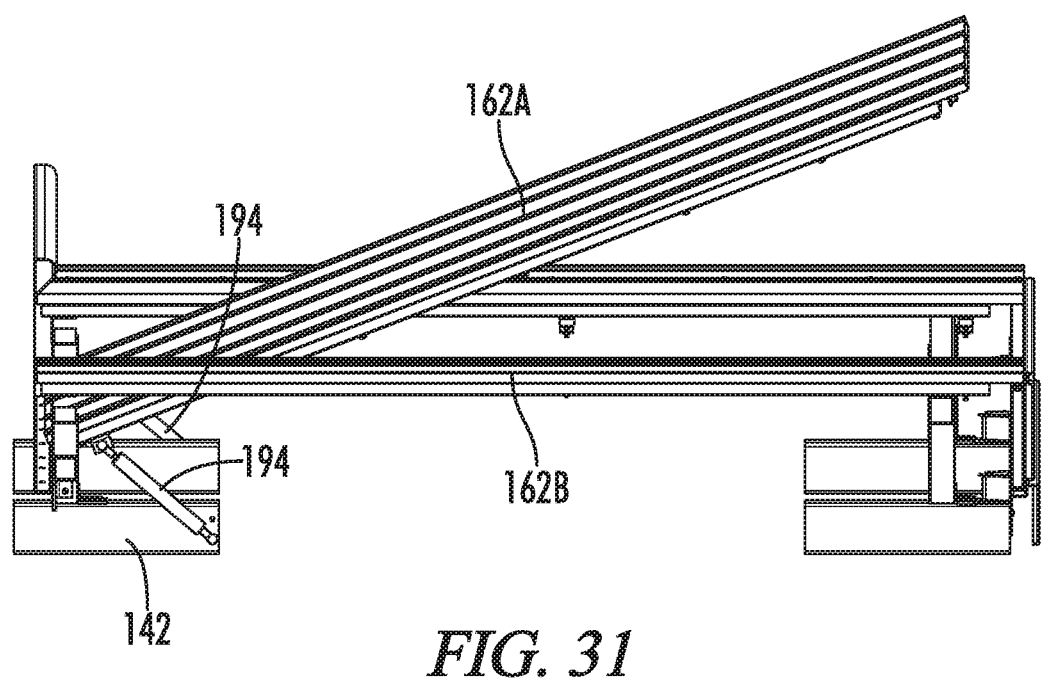
FIG. 31 illustrates a side perspective view of the tilting truck bed of FIG. 23 in a tilted position.
Figure 32A:
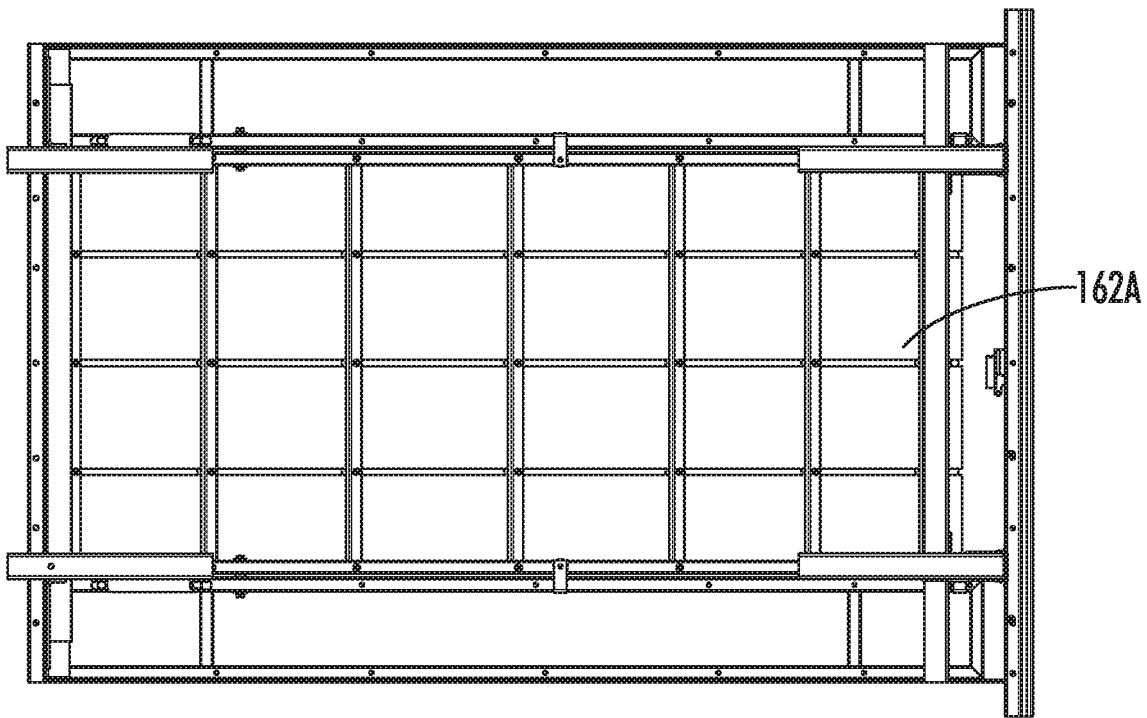
FIG. 32A illustrates a bottom plan view of the tilting truck bed of FIG. 23 in a tilted position.
Figure 32B:
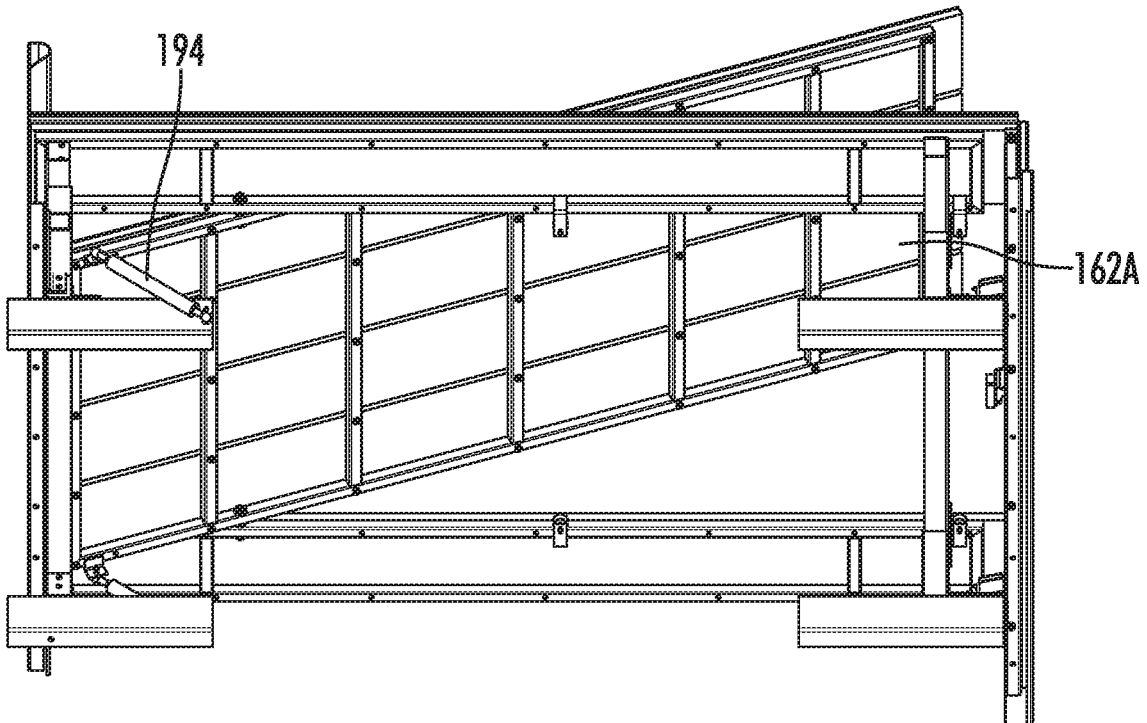
FIG. 32B illustrates a bottom perspective view of the tilting truck bed of FIG. 23 in a tilted position.
Figure 33:
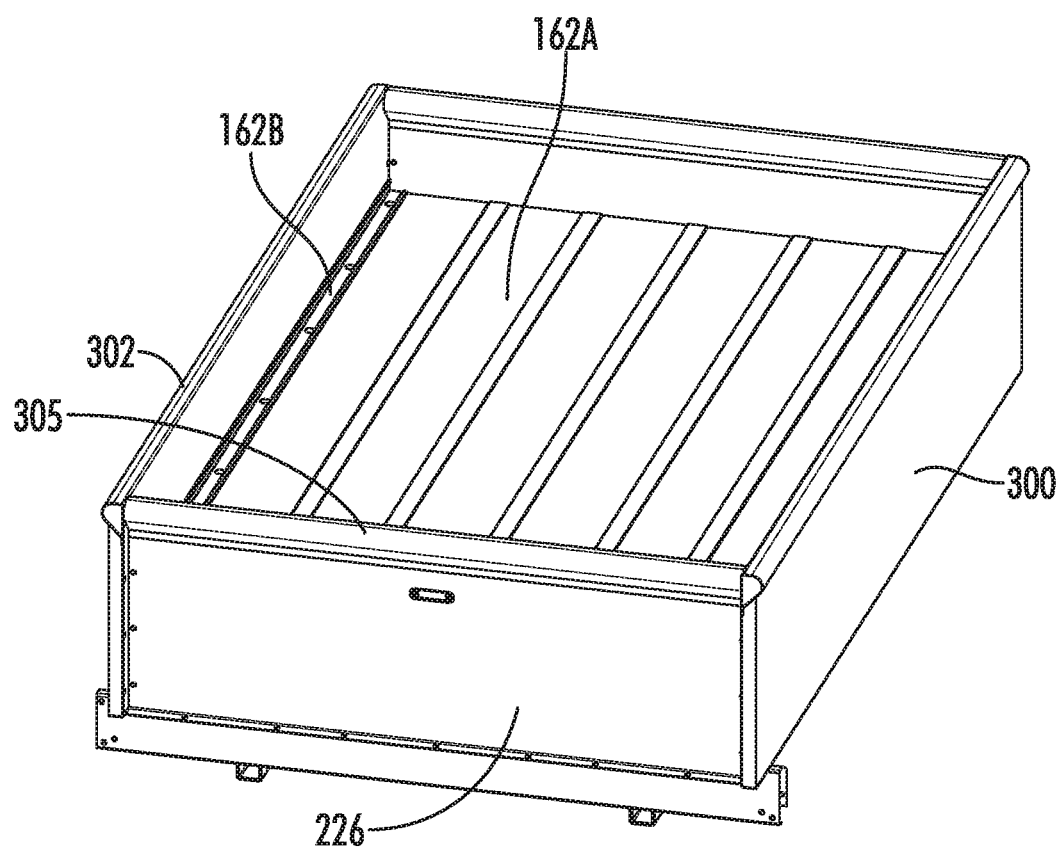
FIG. 33 illustrates a rear perspective view of the pickup truck of FIG. 23 that further includes a left bedside, right bedside and a tailgate.
Figure 34:
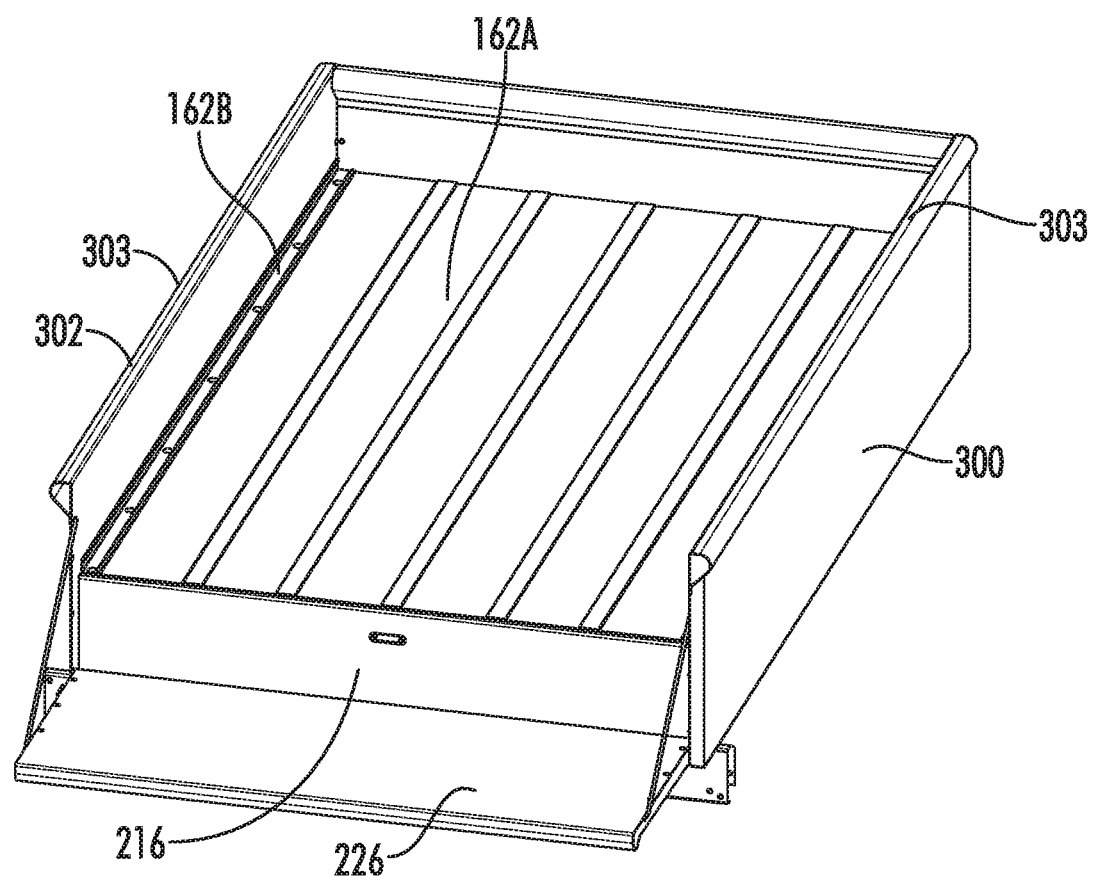
FIG. 34 illustrates a rear perspective view of the truck of FIG. 33.
Figure 35:
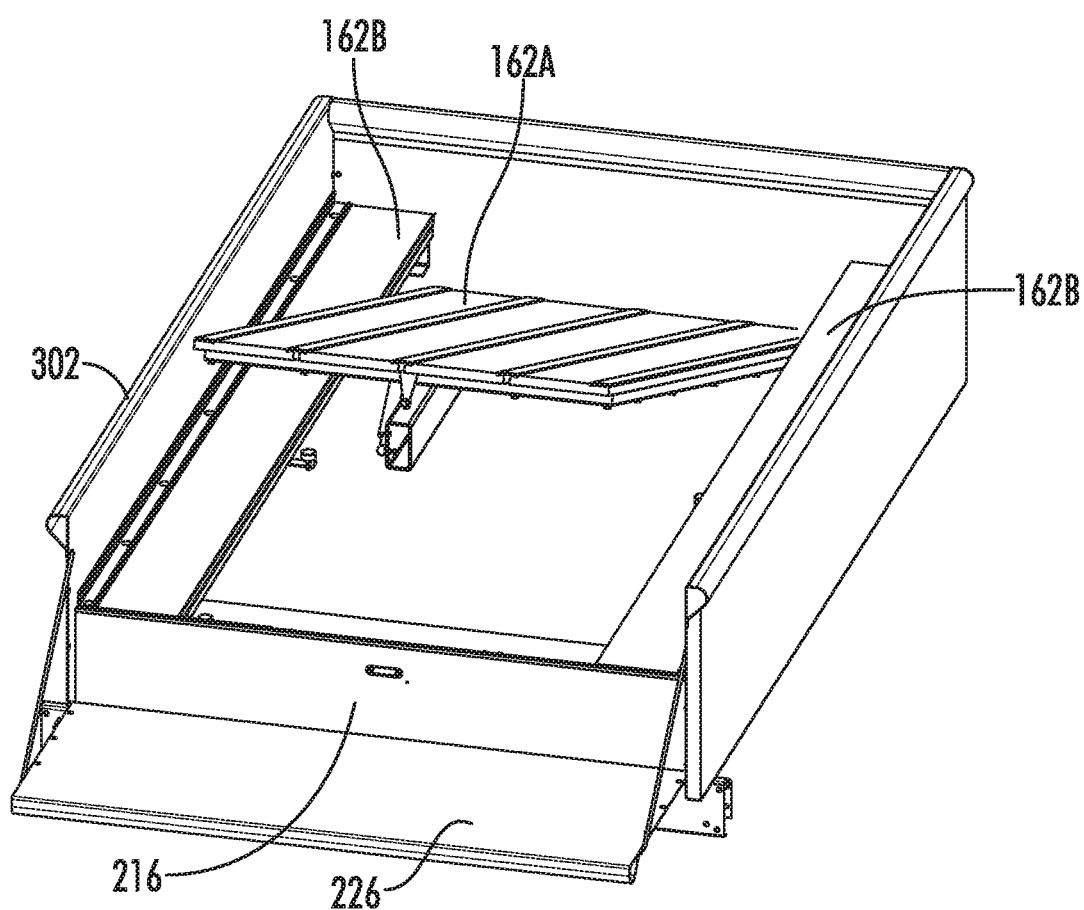
FIG. 35 illustrates a rear perspective view of the truck of FIG. 33.

Optionally, as best seen in FIG. 31, the at least one rod 194 may include a compressible spring. Optionally, the at least one rod 194 may be in the form of at least one compression strut. Further, the rod length 200 may be longer in the resting position than in the tilted position. Optionally, upon moving from the resting position to the tilted position, the bed front 164 may be configured to move downward relative to the ground and the plurality of wheels and the bed rear 166 may be configured to move upward relative to the ground and the plurality of wheels. Optionally, the left pivot 170 may be a left pivot pin 208 and the right pivot 174 may be a right pivot pin 210. The left and right pivot pins 208,210 may be generally parallel to the left and right pivot axes. Optionally, the truck further includes a rear sill extension panel 216 that has a front surface 218 facing forwardly and a rear surface 220 facing rearwardly (and the tailgate 226 when the tailgate 226 is upright). Optionally, the top 222 of the rear sill extension panel 216 is co-planar with the moveable portion of the truck bed 162A when the moveable portion 162A is in the resting position and the top 222 of the rear sill extension panel 216 is not co-planar with the moveable portion of the truck bed 162A when the moveable portion 162A is in the tilting position Optionally, the lock 202 may comprise a button 224 located on the rear sill extension panel 216 rear surface 220.

Optionally, as previously described with the embodiments of FIGS. 1-22, the tailgate 226 may comprise a front surface, a rear surface, a tailgate thickness extending from the front surface to the rear surface, a tailgate interior, a tailgate left side, a tailgate right side, a tailgate width extending from the tailgate left side to the tailgate right side and generally perpendicular to the tailgate thickness, a tailgate top, a tailgate bottom, a tailgate height extending from the tailgate top to the tailgate bottom and generally perpendicular to the tailgate width and tailgate thickness. Optionally, as previously described, the tailgate 226 may be hingedly attached to the left bedside and the right bedside by a hinge located adjacent to the tailgate bottom. Optionally, as previously described, the tailgate 226 may be configured to pivot along a tailgate pivot axis from an upright position in which the tailgate front surface is generally perpendicular to the ground and faces the cargo area 150 to a lowered position in which the tailgate 226 is generally parallel to the ground.

Optionally, the lock may further comprise a rotary latch 250 configured to release the moveable portion 162A to allow the moveable portion to transition from the resting position to the tilted position. Optionally, the lock is similar to the rotary latch 250 that controls the tailgate 226, as described in the embodiments of FIGS. 1-22. Optionally, the button 224 may control the rotary latch 250. Optionally, the rotary latch 250 may comprise a latch bolt 252 located on the bed rear 166 and a latch bolt receiver 254 located on the rear sill extension panel 216. Optionally, the latch bolt 252 may face rearwardly and be located adjacent to the bed rear 166. Optionally, the latch bolt 252 may comprise a circumferential rim extending around a circumference of the latch bolt 252. Optionally, the latch bolt receiver 254 may be configured to receive the latch bolt 252 when the moveable portion 162A is in the resting position. Optionally, the latch bolt receiver 254 may be configured to release the latch bolt 252 when the button 224 is activated. Without limiting the present invention, it should be noted that an advantage of the tilting truck bed 136 is that it may allow the bed floor 192 of the truck to lift up to reveal the frame 142, air suspension, gas tank, and other features located below.

| Part List | |
|---|---|
| System | 10 |
| Pickup truck | 12 |
| Pickup forward section | 14 |
| Truck cab | 16 |
| Pickup rear section | 18 |
| Cargo area | 20 |
| Wheel | 21 |
| Left bedside | 22 |
| Left bedside rear | 24 |
| Right bedside | 26 |
| Right bedside rear | 28 |
| Truck bed | 30 |
| Bed front | 32 |
| Bed rear | 34 |
| Bed left side | 36 |
| Bed right side | 38 |
| Tailgate | 40 |
| Tailgate front surface | 42 |

-continued

Part List

| Tailgate rear surface | 44 |
| --- | --- |
| Tailgate thickness | 46 |
| Tailgate interior | 48 |
| Tailgate left side | 50 |
| Tailgate right side | 52 |
| Tailgate width | 54 |
| Tailgate top | 56 |
| Tailgate bottom | 58 |
| Tailgate height | 60 |
| Hinge/hinge rod | 62 |
| Tailgate pivot axis | 64 |
| Push button | 66 |
| Striker pin(s) | 68 |
| Rotary latch(es) | 70 |
| Rotatable rod | 72 |
| Rod proximal end | 74 |
| Rod distal end | 76 |
| Rod length | 78 |
| Rod pivot axis | 80 |
| L-shaped button mounting bracket | 82 |
| Vertical bar portion | 84 |
| Horizontal Bar portion | 86 |
| Horizontal bar proximal end | 88 |
| Horizontal bar distal end | 90 |
| C-shaped recess | 92 |
| Bracket pin | 94 |
| Rotatable rod wall | 96 |
| Wall slot | 98 |
| Rod interior | 100 |
| At least one rotary jaw | 102 |
| Rotary jaw pivot axis | 104 |
| Rotary jaw bolt | 106 |
| Rod extension(s) | 108 |
| Handle bracket | 110 |
| Handle bracket left side | 112 |
| Round pin opening(s) | 114 |
| Round rotatable rod opening(s) | 116 |
| Handle bracket right side | 118 |
| Spring | 120 |
| Spring proximal end | 122 |
| Spring distal end | 124 |
| Rotary jaw recess | 126 |
| rotary pawl | 128 |
| Spring Bolt | 130 |
| Spring Bolt bracket | 132 |
| Tilting truck bed | 136 |
| Truck frame | 142 |
| Cargo area | 150 |
| Truck bed | 162 |
| Truck bed moveable portion | 162A |
| Truck bed stationary portion | 162B |
| Bed front | 164 |
| Bed rear | 166 |
| Bed left side | 168 |
| Left pivot | 170 |
| Bed right side | 172 |
| Right pivot | 174 |
| Rod | 194 |
| Rod top | 196 |
| Rod bottom | 198 |
| Rod length | 200 |
| Lock | 202 |
| Left pivot pin | 208 |
| Right pivot pin | 210 |
| Left pivot axis | 212 |
| Right pivot axis | 214 |
| Rear sill extension panel | 216 |
| Rear sill extension panel front surface | 218 |
| Rear sill extension panel rear surface | 220 |
| Rear sill extension panel top | 222 |
| Button | 224 |
| Tailgate | 226 |
| Rotary latch | 250 |
| Latch bolt | 252 |
| Latch bolt receiver | 254 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A pickup truck comprising:
a plurality of wheels configured to rotate around a plurality of wheel axes and travel along the ground;
a truck frame connected to the plurality of wheels and comprising a forward section comprising a truck cab, and a rear section located to the rear of the forward section and comprising a cargo area comprising a left bedside having a left bedside rear, a right bedside having a right bedside rear, and a cargo area bottom comprising a truck bed,
wherein the truck bed comprises a moveable portion comprising a bed front, a bed rear, a bed left side pivotably connected to the truck frame between the bed front and bed rear at a left pivot and a bed right side pivotably connected to the truck frame between the bed front and bed rear at a right pivot, the left pivot and right pivot each having a pivot axis generally parallel to the wheel axes;
wherein the pickup truck further comprises at least one rod having a top end attached to the moveable portion, a bottom end attached to the truck frame and a rod length extending from the top end to the bottom end,
wherein the moveable portion is configured to tilt about the left pivot axis and right pivot axis between a resting position in which the moveable portion is generally parallel to the ground and a tilted position in which the moveable portion is not generally parallel to the ground, and
wherein, when the moveable portion moves from the resting position to the tilted position, the rod top end is configured to move toward the rod bottom end.

2. The pickup truck of claim 1 wherein the at least one rod comprises a compressible spring.

3. The pickup truck of claim 1 wherein the at least one rod is in the form of at least one compression strut and further wherein the rod length is longer in the resting position than in the tilted position.

4. The pickup truck of claim 1, wherein upon moving from the resting position to the tilted position, the bed front is configured to move downward relative to the ground and the plurality of wheels and the bed rear is configured to move upward relative to the ground and the plurality of wheels.

5. The pickup truck of claim 1 wherein the left pivot is a left pivot pin and the right pivot is a right pivot pin, the left and right pivot pins being generally parallel to the left and right pivot axes.

6. The pickup truck of claim 1 wherein the pickup truck further comprises a tailgate located rearwardly relative to the bed rear and comprising a front surface, a rear surface, a tailgate thickness extending from the front surface to the rear surface, a tailgate interior, a tailgate left side, a tailgate right side, a tailgate width extending from the tailgate left side to the tailgate right side and generally perpendicular to the tailgate thickness, a tailgate top, a tailgate bottom, a tailgate height extending from the tailgate top to the tailgate bottom and generally perpendicular to the tailgate width and tailgate thickness, the tailgate hingedly attached to the left bedside and the right bedside by a hinge located adjacent to the tailgate bottom, the tailgate configured to pivot along a tailgate pivot axis from an upright position in which the tailgate front surface is generally perpendicular to the ground and the tailgate front surface faces the cargo area to a lowered position in which the tailgate front surface is generally parallel to the ground.

7. The pickup truck of claim 6 wherein the tailgate front surface is generally perpendicular to the moveable portion when the tailgate is in the upright position and the moveable portion is in the resting position and the tailgate front surface is not generally perpendicular to the moveable portion when the tailgate is in the upright position and the moveable portion is in the tilted position.

8. The pickup truck of claim 1, wherein the pickup truck further comprises a rear sill extension panel comprising a front surface facing forwardly and a rear surface facing failing the rearwardly, wherein the pickup truck further comprises a lock configured to maintain the truck bed in the resting position, and further wherein the lock comprises a button located on the rear sill extension panel rear surface.

9. The pickup truck of claim 8, wherein the lock further comprises a rotary latch configured to release the moveable portion from the resting position to allow the moveable portion to move into the tilted position and further wherein the button controls the rotary latch.

10. The pickup truck of claim 9, wherein the rotary latch comprises a latch bolt located on the moveable portion beneath the bed rear and a latch bolt receiver located on the rear sill extension panel.

11. The pickup truck of claim 10, wherein the latch bolt faces rearwardly.

12. The pickup truck of claim 10, wherein the latch bolt receiver is configured to receive the latch bolt when the moveable portion is in the resting position, and wherein the latch bolt receiver is configured to release the latch bolt when the button is activated.

13. The pickup truck of claim 8 wherein the rear sill extension panel comprises a top, and further wherein said top of said rear sill extension panel is substantially co-planar with the moveable portion when the truck bed is in the resting position.

14. A method of tilting a truck bed of a pickup truck comprising the steps of:
a) providing the pickup truck of claim 1 wherein the moveable portion is in the resting position; and
b) moving the moveable portion to the tilted position.

15. A pickup truck comprising:
a plurality of wheels configured to rotate around a plurality of wheel axes travel along the ground;
a truck frame connected to the plurality of wheels and comprising a forward section comprising a truck cab, and a rear section located to the rear of the forward section and comprising a cargo area comprising a left bedside having a left bedside rear, a right bedside having a right bedside rear, and a cargo area bottom comprising a truck bed,
wherein the truck bed comprises a stationary portion and a moveable portion, the moveable portion comprising a bed front, a bed rear, a bed left side pivotably connected to the stationary portion between the bed front and bed rear at a left pivot and a bed right side pivotably connected to the stationary portion between the bed front and bed rear at a right pivot, the left pivot and right pivot each having a pivot axis generally parallel to the wheel axes;

wherein the pickup truck further comprises at least one rod having a top end attached to the moveable portion, a bottom end attached to the truck frame and a rod length extending from the top end to the bottom end, wherein the moveable portion is configured to tilt about the left pivot axis and right pivot axis between a resting position in which the moveable portion is generally parallel to the ground and the stationary portion and a tilted position in which the moveable portion is not generally parallel to the ground and the stationary portion, wherein, when the moveable portion moves from the resting position to the tilted position, the stationary portion does not tilt, and wherein, when the moveable portion moves from the resting position to the tilted position, the rod top end is configured to move toward the rod bottom end.

16. The pickup truck of claim 15, wherein upon moving from the resting position to the tilted position, the bed front is configured to move downward below the stationary portion and the bed rear is configured to move upward above the stationary portion.

17. The pickup truck of claim 15 wherein the pickup truck further comprises a tailgate located rearwardly relative to the bed rear and comprising a front surface, a rear surface, a tailgate thickness extending from the front surface to the rear surface, a tailgate interior, a tailgate left side, a tailgate right side, a tailgate width extending from the tailgate left side to the tailgate right side and generally perpendicular to the tailgate thickness, a tailgate top, a tailgate bottom, a tailgate height extending from the tailgate top to the tailgate bottom and generally perpendicular to the tailgate width and tailgate thickness, the tailgate hingedly attached to the left bedside and the right bedside by a hinge located adjacent to the tailgate bottom, the tailgate configured to pivot along a tailgate pivot axis from an upright position in which the tailgate front surface is generally perpendicular to the ground and the tailgate front surface faces the cargo area to a lowered position in which the tailgate front surface is generally parallel to the ground.

18. The pickup truck of claim 17 wherein the tailgate front surface is generally perpendicular to the moveable portion when the tailgate is in the upright position and the moveable portion is in the resting position, wherein the tailgate front surface is not generally perpendicular to the moveable portion when the tailgate is in the upright position and the moveable portion is in the tilted position, wherein the tailgate front surface is generally perpendicular to the stationary portion when the tailgate is in the upright position, and further wherein the tailgate front surface is parallel to the stationary portion when the tailgate is in the lowered position.

* * * * *